US012659330B2

(12) United States Patent
Parsacala et al.

(10) Patent No.: US 12,659,330 B2
(45) Date of Patent: Jun. 16, 2026

(54) APPLICATION PROFILE DEFINITION FOR CYBER BEHAVIORS

(71) Applicant: TRUEFORT, INC., Weehawken, NJ (US)

(72) Inventors: Nazario Parsacala, Weehawken, NJ (US); Sameer Malhotra, Weekhawken, NJ (US)

(73) Assignee: TRUEFORT, INC., Weehawken, NJ (US)

( * ) Notice: Subject to any disclaimer, the term of this patent is extended or adjusted under 35 U.S.C. 154(b) by 198 days.

(21) Appl. No.: 18/456,459

(22) Filed: Aug. 25, 2023

(65) Prior Publication Data

US 2023/0421592 A1      Dec. 28, 2023

Related U.S. Application Data

(60) Provisional application No. 63/355,660, filed on Jun. 27, 2022.

(51) Int. Cl.
*H04L 9/40* (2022.01)
*H04L 43/065* (2022.01)

(52) U.S. Cl.
CPC ........ *H04L 63/1425* (2013.01); *H04L 43/065* (2013.01); *H04L 63/1416* (2013.01)

(58) Field of Classification Search
CPC ............. H04L 63/1425; H04L 63/1416; H04L 43/065; H04L 43/08; H04L 43/0817; H04L 41/142; H04L 41/16
See application file for complete search history.

(56) References Cited

U.S. PATENT DOCUMENTS

| | | |
|---|---|---|
| 7,277,823 B2 | 10/2007 | Harrison et al. |
| 7,581,434 B1 | 9/2009 | Discenzo et al. |
| 7,594,270 B2 | 9/2009 | Church et al. |
| 7,647,645 B2 | 1/2010 | Edeki et al. |
| 7,685,083 B2 | 3/2010 | Fairweather |
| 7,876,960 B2 | 1/2011 | Lapstun et al. |
| 7,890,612 B2 | 2/2011 | Todd et al. |
| 7,974,714 B2 | 7/2011 | Hoffberg |
| 8,073,777 B2 | 12/2011 | Barry et al. |

(Continued)

*Primary Examiner* — Richard G Keehn
(74) *Attorney, Agent, or Firm* — JUNEAU & MITCHELL; Todd L. Juneau

(57) ABSTRACT

The invention relates to computer security, and specifically to a method and system for defining the profile of expected application behaviors. According to one aspect, multiple application behavioral metric definitions are expressed for expected application interactions and state on a temporal basis. At least some of the behavioral definition metrics are expressed based on an association with an application profile or common entity. The expressed application profile definitions (APDs) are utilized to evaluate whether actual behavioral conditions specified by application profile white lists, policies and or security policies associated with the common entity have been satisfied. APDs are a defined set of metrics that can be expressed using the APD creator wizard or express using XLM, Json or any other software definition format. Responsive to evaluating that a APD behavioral condition has been deviated, an alert is generated and communicated to one or more response devices associated with the common entity.

2 Claims, 19 Drawing Sheets

APPLICATION BEHAVIOR PROFILE ANOMALY DETECTION

(56) References Cited

U.S. PATENT DOCUMENTS

| | | | |
|---|---|---|---|
| 8,284,461 B2 | 10/2012 | Rusman et al. |
| 8,356,001 B2 | 1/2013 | Collazo |
| 8,560,679 B2 | 10/2013 | Njemanze et al. |
| 8,607,353 B2 | 12/2013 | Rippert, Jr. et al. |
| 8,730,946 B2 | 5/2014 | Mantripragada et al. |
| 8,768,731 B2 | 7/2014 | Moore |
| 8,856,936 B2 | 10/2014 | Ray et al. |
| 8,887,286 B2 | 11/2014 | Dupont et al. |
| 8,903,593 B1 | 12/2014 | Addepalli et al. |
| 8,938,532 B2 | 1/2015 | Terrell et al. |
| 9,060,341 B2 | 6/2015 | Karr et al. |
| 9,077,744 B2 | 7/2015 | Beutel et al. |
| 9,104,915 B2 | 8/2015 | Conwell |
| 9,123,186 B2 | 9/2015 | Ricci |
| 9,154,516 B1 | 10/2015 | Vaystikh et al. |
| 9,166,993 B1 | 10/2015 | Liu |
| 9,213,990 B2 | 12/2015 | Adjaoute |
| 9,215,244 B2 | 12/2015 | Ayyagari et al. |
| 9,407,509 B2 | 8/2016 | Porras et al. |
| 9,462,009 B1 | 10/2016 | Kolman et al. |
| 9,602,530 B2 | 3/2017 | Ellis et al. |
| 9,609,010 B2 | 3/2017 | Sipple |
| 9,648,034 B2 | 5/2017 | Bailey et al. |
| 9,672,355 B2 | 6/2017 | Titonis et al. |
| 9,813,435 B2 | 11/2017 | Muddu et al. |
| 9,860,257 B1 | 1/2018 | Kumar et al. |
| 9,886,845 B2 | 2/2018 | Rhoads et al. |
| 9,905,122 B2 | 2/2018 | Sloo et al. |
| 9,967,279 B2 | 5/2018 | Chesla et al. |
| 9,990,182 B2 | 6/2018 | Misra et al. |
| 10,003,608 B2 | 6/2018 | Treat et al. |
| 10,019,677 B2 | 7/2018 | Gill et al. |
| 10,020,935 B1 | 7/2018 | Ghetti et al. |
| 10,021,138 B2 | 7/2018 | Gill et al. |
| 10,051,349 B2 | 8/2018 | Schattmaier et al. |
| 10,057,264 B1 | 8/2018 | Elnakib et al. |
| 10,091,169 B2 | 10/2018 | Cohen et al. |
| 10,116,674 B2 | 10/2018 | Baradaran et al. |
| 10,122,747 B2 | 11/2018 | Mahaffey et al. |
| 10,148,680 B1 | 12/2018 | Segev et al. |
| 10,157,278 B2 | 12/2018 | Aguayo Gonzalez et al. |
| 10,311,694 B2 | 6/2019 | McIntosh et al. |
| 10,333,798 B2 | 6/2019 | Chan et al. |
| 10,341,363 B1 | 7/2019 | Vincent et al. |
| 10,352,505 B2 | 7/2019 | McDowell et al. |
| 10,382,454 B2 | 8/2019 | Avidan et al. |
| 10,445,311 B1 | 10/2019 | Saurabh et al. |
| 10,476,893 B2 | 11/2019 | Baradaran et al. |
| 10,476,899 B2 | 11/2019 | Cochin et al. |
| 10,504,020 B2 | 12/2019 | Trenholm et al. |
| 10,581,977 B2 | 3/2020 | Goldfarb et al. |
| 10,616,249 B2 | 4/2020 | C et al. |
| 10,673,617 B1 | 6/2020 | Antoniou et al. |
| 10,673,880 B1 | 6/2020 | Pratt et al. |
| 10,728,117 B1 | 7/2020 | Sharma et al. |
| 10,764,313 B1 | 9/2020 | Mushtaq |
| 10,778,705 B1 | 9/2020 | Park et al. |
| 10,824,702 B1 | 11/2020 | Shahidzadeh et al. |
| 10,824,726 B1 | 11/2020 | Herman et al. |
| 10,892,964 B2 | 1/2021 | Sharma et al. |
| 10,902,117 B1 | 1/2021 | Singh et al. |
| 10,902,121 B2 | 1/2021 | Chari et al. |
| 10,909,468 B2 | 2/2021 | Yamada et al. |
| 10,910,882 B2 | 2/2021 | Smith et al. |
| 10,922,631 B1 | 2/2021 | Shahidzadeh |
| 10,924,517 B2 | 2/2021 | Epple et al. |
| 11,005,839 B1 | 5/2021 | Shahidzadeh et al. |
| 11,005,871 B2 | 5/2021 | Anakata et al. |
| 11,032,307 B2 | 6/2021 | Tsironis |
| 11,038,905 B2 | 6/2021 | Zadeh et al. |
| 11,049,004 B1 | 6/2021 | Segev |
| 11,049,039 B2 | 6/2021 | Zimmer et al. |
| 11,089,034 B2 | 8/2021 | Dichiu et al. |
| 11,126,612 B2 | 9/2021 | Gaber et al. |
| 11,133,953 B2 | 9/2021 | Shive et al. |
| 11,153,331 B2 | 10/2021 | Zou et al. |
| 11,201,881 B2 | 12/2021 | Janakiraman |
| 11,275,841 B2 | 3/2022 | Poliakov |
| 11,297,078 B2 | 4/2022 | Johnson et al. |
| 11,321,464 B2 | 5/2022 | Govardhan |
| 11,347,191 B2 | 5/2022 | Hsu |
| 11,374,955 B2 | 6/2022 | Bisht et al. |
| 11,405,417 B2 | 8/2022 | Doron et al. |
| 11,451,581 B2 | 9/2022 | Sirianni et al. |
| 11,455,641 B1 | 9/2022 | Shahidzadeh et al. |
| 11,481,495 B2 | 10/2022 | Chai et al. |
| 11,539,717 B2 | 12/2022 | Bratspiess et al. |
| 11,550,908 B2 | 1/2023 | Long et al. |
| 11,552,940 B1 | 1/2023 | Shahidzadeh et al. |
| 11,575,688 B2 | 2/2023 | Chai et al. |
| 11,595,434 B2 | 2/2023 | Zegeye et al. |
| 11,606,367 B2 | 3/2023 | Chen |
| 11,658,993 B2 | 5/2023 | Smelov et al. |
| 11,659,399 B2 | 5/2023 | Montalvo et al. |
| 11,665,178 B2 | 5/2023 | Gutierrez et al. |
| 11,680,867 B2 | 6/2023 | Papadimitriou et al. |
| 11,687,805 B2 | 6/2023 | Stubbs et al. |
| 11,729,196 B2 | 8/2023 | Ciocarlie et al. |
| 2010/0156630 A1 | 6/2010 | Ainsbury |
| 2014/0137257 A1 | 5/2014 | Martinez et al. |
| 2015/0081158 A1 | 3/2015 | Stilkerich |
| 2015/0199501 A1 | 7/2015 | Husain |
| 2016/0080425 A1* | 3/2016 | Cianfrocca ......... H04L 63/0227 |
| | | | 726/1 |
| 2016/0237804 A1 | 8/2016 | Papadimitriou et al. |
| 2016/0267408 A1 | 9/2016 | Singh et al. |
| 2016/0274660 A1 | 9/2016 | Publicover et al. |
| 2016/0292434 A1 | 10/2016 | Nefedov et al. |
| 2016/0359697 A1 | 12/2016 | Scheib et al. |
| 2016/0371489 A1 | 12/2016 | Puri et al. |
| 2017/0085587 A1 | 3/2017 | Turgeman |
| 2017/0214708 A1 | 7/2017 | Gukal et al. |
| 2017/0223046 A1 | 8/2017 | Singh |
| 2017/0257388 A1 | 9/2017 | Addepalli et al. |
| 2017/0264640 A1 | 9/2017 | Narayanaswamy et al. |
| 2017/0279836 A1 | 9/2017 | Vasseur et al. |
| 2017/0279838 A1 | 9/2017 | Dasgupta et al. |
| 2017/0279839 A1 | 9/2017 | Vasseur et al. |
| 2017/0286572 A1 | 10/2017 | Hershey et al. |
| 2017/0353477 A1 | 12/2017 | Faigon et al. |
| 2018/0007118 A1* | 1/2018 | Loza ...................... H04L 43/08 |
| 2018/0027006 A1 | 1/2018 | Zimmermann et al. |
| 2018/0054376 A1 | 2/2018 | Hershey et al. |
| 2018/0054458 A1* | 2/2018 | Marck ................ H04L 63/1458 |
| 2018/0091539 A1 | 3/2018 | Marquardt et al. |
| 2018/0103047 A1 | 4/2018 | Turgeman et al. |
| 2018/0137244 A1 | 5/2018 | Sorenson et al. |
| 2018/0183818 A1* | 6/2018 | Malhotra ............ H04L 63/1425 |
| 2018/0219889 A1 | 8/2018 | Oliner et al. |
| 2018/0248902 A1 | 8/2018 | Dănilă-Dumitrescu et al. |
| 2018/0255076 A1 | 9/2018 | Paine |
| 2018/0288063 A1 | 10/2018 | Koottayi et al. |
| 2018/0307899 A1 | 10/2018 | Das et al. |
| 2018/0316727 A1 | 11/2018 | Tsironis |
| 2018/0376305 A1 | 12/2018 | Ramalho de Oliveira |
| 2018/0376306 A1 | 12/2018 | Ramalho de Oliveira |
| 2019/0095320 A1 | 3/2019 | Biswas et al. |
| 2019/0098037 A1 | 3/2019 | Shenoy, Jr. et al. |
| 2019/0124104 A1 | 4/2019 | Apostolopoulos |
| 2019/0158524 A1 | 5/2019 | Zadeh et al. |
| 2019/0171950 A1 | 6/2019 | Srivastava |
| 2019/0174319 A1 | 6/2019 | Backholm et al. |
| 2019/0219995 A1 | 7/2019 | Cella et al. |
| 2019/0236485 A1 | 8/2019 | Stanley, III et al. |
| 2019/0244129 A1 | 8/2019 | Tabuchi et al. |
| 2019/0258953 A1 | 8/2019 | Lang et al. |
| 2019/0306011 A1 | 10/2019 | Fenoglio et al. |
| 2019/0335333 A1 | 10/2019 | Sohail et al. |
| 2019/0377819 A1 | 12/2019 | Filliben et al. |
| 2019/0378010 A1 | 12/2019 | Morris et al. |
| 2019/0378049 A1 | 12/2019 | Widmann et al. |
| 2019/0378050 A1 | 12/2019 | Edkin et al. |
| 2019/0378051 A1 | 12/2019 | Widmann et al. |
| 2020/0021609 A1 | 1/2020 | Kuppanna et al. |

(56)  References Cited

U.S. PATENT DOCUMENTS

| | | | |
|---|---|---|---|
| 2020/0036739 A1 | 1/2020 | Novikov et al. | |
| 2020/0045069 A1 | 2/2020 | Nanda et al. | |
| 2020/0084087 A1 | 3/2020 | Sharma et al. | |
| 2020/0090027 A1 | 3/2020 | Oliner et al. | |
| 2020/0104497 A1 | 4/2020 | Crouch et al. | |
| 2020/0128047 A1 | 4/2020 | Biswas et al. | |
| 2020/0151587 A1* | 5/2020 | Ahringer | H04N 21/258 |
| 2020/0162280 A1 | 5/2020 | Drees et al. | |
| 2020/0233962 A1 | 7/2020 | Chantry | |
| 2020/0285997 A1 | 9/2020 | Bhattacharyya et al. | |
| 2020/0327223 A1 | 10/2020 | Sanchez et al. | |
| 2020/0329066 A1 | 10/2020 | Kirti et al. | |
| 2020/0394455 A1 | 12/2020 | Lee et al. | |
| 2020/0396258 A1 | 12/2020 | Jeyakumar et al. | |
| 2021/0014265 A1 | 1/2021 | Hadar et al. | |
| 2021/0034994 A1 | 2/2021 | Stocker et al. | |
| 2021/0049217 A1 | 2/2021 | Ogawa et al. | |
| 2021/0076212 A1 | 3/2021 | Manikantan et al. | |
| 2021/0086354 A1* | 3/2021 | Berg | G06Q 10/0633 |
| 2021/0139040 A1 | 5/2021 | Ganiger et al. | |
| 2021/0151176 A1 | 5/2021 | Narasimhan et al. | |
| 2021/0152569 A1 | 5/2021 | Mortensen et al. | |
| 2021/0194924 A1 | 6/2021 | Heinemeyer et al. | |
| 2021/0234877 A1 | 7/2021 | Prabhu et al. | |
| 2021/0273957 A1 | 9/2021 | Boyer et al. | |
| 2021/0304002 A1 | 9/2021 | George et al. | |
| 2021/0307621 A1 | 10/2021 | Svenson et al. | |
| 2021/0334821 A1 | 10/2021 | Berrington et al. | |
| 2021/0360027 A1 | 11/2021 | Boyer et al. | |
| 2022/0066987 A1 | 3/2022 | Savir et al. | |
| 2022/0101326 A1 | 3/2022 | Kim et al. | |
| 2022/0114260 A1 | 4/2022 | Udupi et al. | |
| 2022/0114262 A1 | 4/2022 | Bhatia et al. | |
| 2022/0121744 A1 | 4/2022 | Mishra et al. | |
| 2022/0131883 A1 | 4/2022 | Wolff et al. | |
| 2022/0156369 A1 | 5/2022 | Narayanaswamy et al. | |
| 2022/0224700 A1 | 7/2022 | Appel et al. | |
| 2022/0263855 A1 | 8/2022 | Engelberg et al. | |
| 2022/0360597 A1 | 11/2022 | Fellows et al. | |
| 2022/0374524 A1 | 11/2022 | Pandey et al. | |
| 2022/0374796 A1* | 11/2022 | Raymond | G06Q 10/04 |
| 2023/0011004 A1 | 1/2023 | Fellows et al. | |
| 2023/0068909 A1 | 3/2023 | Bean et al. | |
| 2023/0076372 A1 | 3/2023 | Engelberg et al. | |
| 2023/0135660 A1 | 5/2023 | Chapman et al. | |
| 2023/0138805 A1* | 5/2023 | Kumar | H04L 63/1416 |
| | | | 726/1 |
| 2023/0246931 A1* | 8/2023 | Chang | H04L 43/08 |
| | | | 709/212 |
| 2023/0252754 A1 | 8/2023 | Vaughan | |
| 2025/0159007 A1* | 5/2025 | Kumar | H04L 63/1425 |

* cited by examiner

APPLICATION BEHAVIOR PROFILE ANOMALY DETECTION

APPLICATION BEHAVIOR PROFILE LEARNING

APPLICATION BEHAVIOR PROFILE MANUAL DEFINITION

301

Application Profile Definition
- Can be manually defined by the application teams.
- Application teams can edit learned behavior to fine tune the definition.

324

Application Behavior Profile
- Stored in Application Profile Definition format.
- Format is designed to user readable and editable.

APPLICATION PROFILE DEFINITION TREATED AS CODE

ALERT MERGING TO APPLICATION PROFILE DEFINITION

Fig. 6

APD : DEFINITION AND CREATION

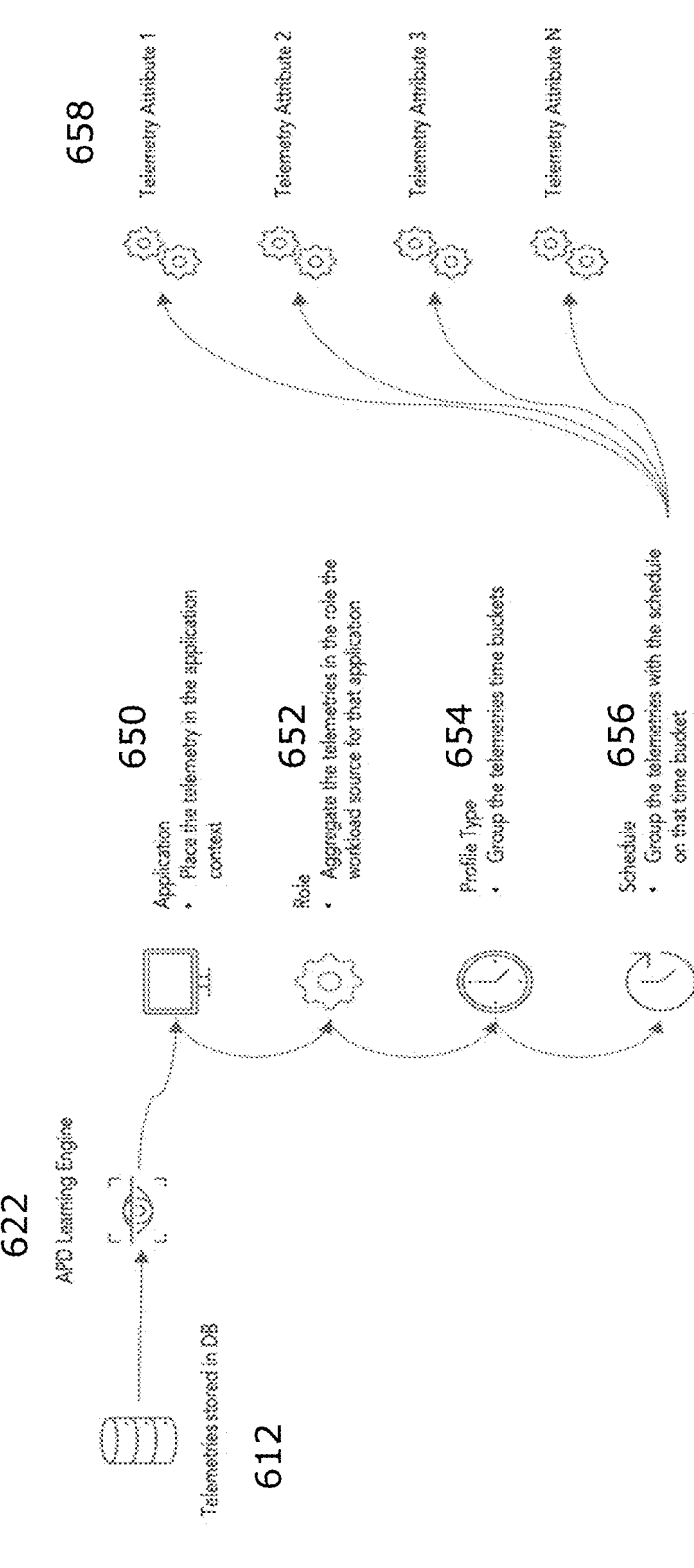

622

APD Learning Engine

612

Telemetries stored in DB

650 Application
* Place the telemetry in the application context

652 Role
* Aggregate the telemetries in the role the workload source for that application 654 Profile Type
* Group the telemetries time buckets 656 Schedule
* Group the telemetries with the schedule on that time bucket

658

Telemetry Attribute 1

Telemetry Attribute 2

Telemetry Attribute 3

Telemetry Attribute N

FIG. 7

APPLICATION-ROLE DEFINITION

To detect application behavior anomalies, the first step is to group workloads into roles that serve a common function within the application. These roles define specific functions or services provided by the workloads.

An application refers to a computer program or set of programs designed for specific tasks or functionality, serving purposes such as productivity, entertainment, communication, or data management.

Workloads, in the context of applications, are computer systems or components that provide resources, services, or functionality to other devices over a network. They manage tasks, network resources, and facilitate communication between devices.

To group workloads, information can be sourced from CMDB-like databases or machine learning techniques can be applied to cluster workloads with similar behavior.

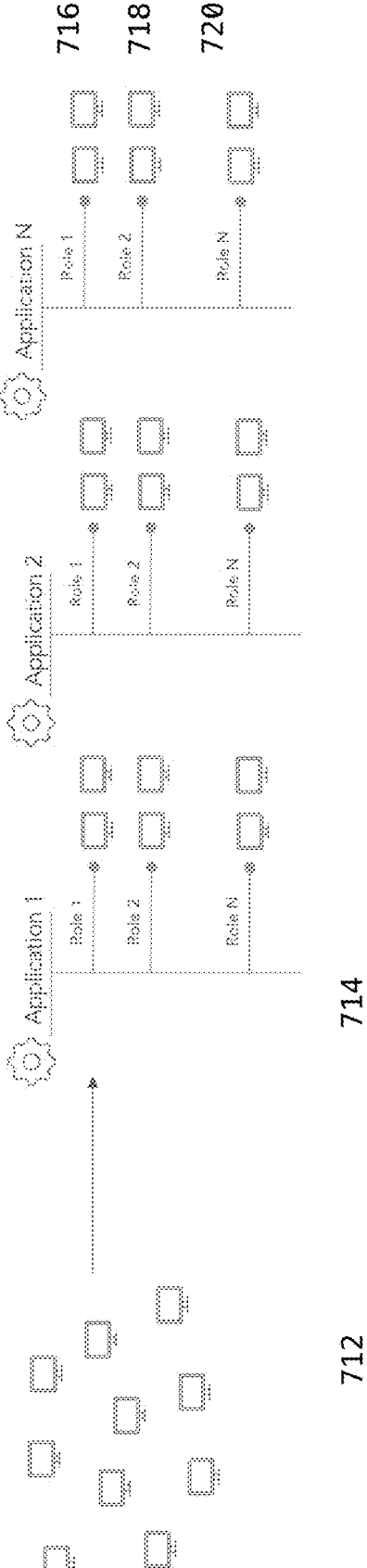

FIG. 8

METRIC SOURCE, GENERATION & ACQUISITION

The next step is to acquire metric data that will serve as the foundation for learning the application role profile. These metrics are sourced from the workloads and represent a time series data, consisting of observations or data points recorded, measured, or collected at regular intervals over a period of time. They provide essential insights into the behavior of a workload.

The system employs a native agent implementation with plugins to observe various behaviors, including:

- Network Traffic
- Process
- Who (User activity)
- File Integrity
- Installed Software
- Network Interface Cards
- System Information
- CPU/Memory Resource Utilization
- File System

820

Each of these observation points follows a predefined schema. The observations are detected in real-time, collected over a period, and transmitted to a central collector through a message bus. The central collector then consumes these metrics and persists them into a highly scalable data store.

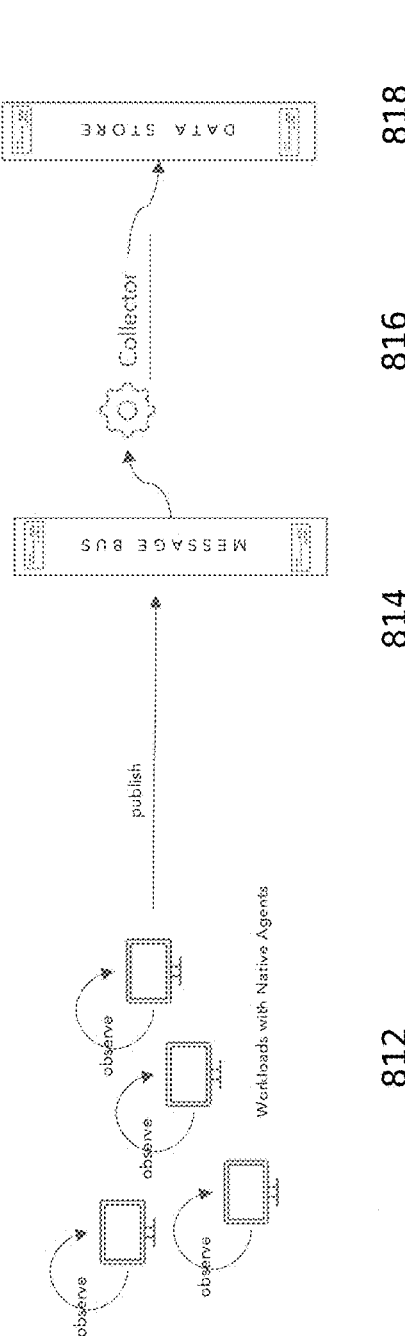

METRIC SOURCE, GENERATION & ACQUISITION

In addition to using workloads with native agents, the system can also obtain metrics from various other sources. These sources include public cloud providers, third-party agents, and NDR (Network Detection and Response) solutions. For each of these sources, a mapping between the source metrics and the equivalent metrics in the system is established. This involves assigning and transforming each attribute of the source metric to match the attributes of the native agent's metrics. These mappings are carried out by translators, specific to each metric source. Each translator is designed to acquire and identify metrics from their respective sources and map them to the system's equivalents.

Once the metrics are translated into the native schema, they are published to the message bus, and the same process as the native agent's metrics is followed.

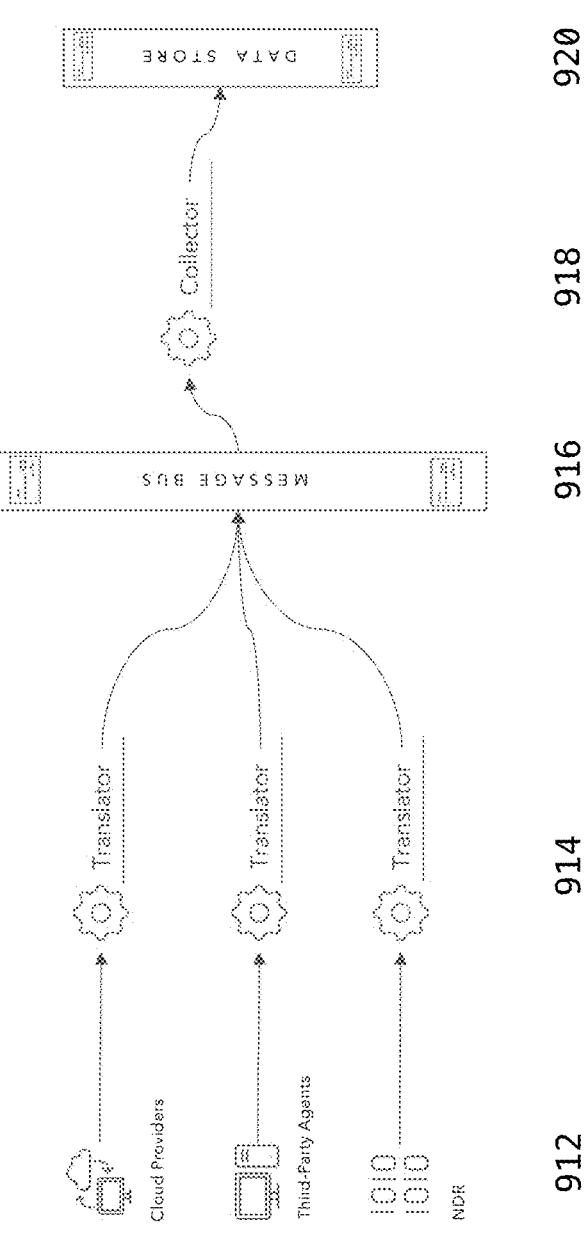

APPLICATION-ROLE BEHAVIOR LEARNING

Once the workloads are assigned to the application-role construct and historical metrics are persisted, the Application-Role behavior learning process can begin.

To initiate the learning process, you can provide the learning engine with the following information: Application, Role, start and end time, and the metric type for profiling. Based on this data, the learning engine will perform the following steps:

- Iterate through all the workloads belonging to the specified Application-Role.
- Read the persisted metrics data associated with the workloads within the specified time range.
- Tokenize the attributes within the metrics data and identify the pivot point for aggregation.
- Aggregate the metrics into time buckets.
- Identify the attribute type within the metrics and apply suitable summarization methods accordingly.
- Optionally, if applicable, match raw metric attribute values with stored classifiers for abstraction.

The resulting profiling will be presented in a human-readable format, allowing end-users to customize it as needed. Finally, the results will be stored in the database as the profile for this Application-Role.

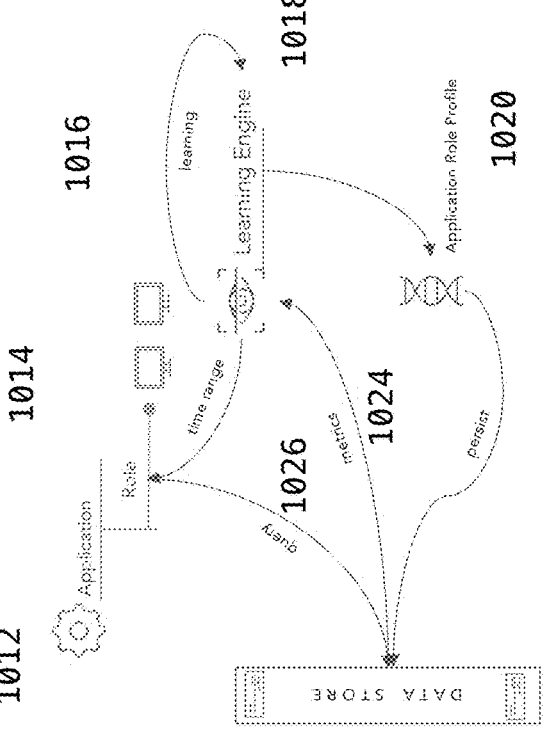

1012    1014    1016    1018    1020    1022    1024    1026

FIG. 11 - sample network behavior profile for an
application role in human readable format

1112

1114

1116

1118

1120

FIG. 12 – sample of process behavior profile for
an application role in a human readable format

FIG. 13

APPLICATION-PROFILE ANOMALY DETECTION

With the application-role defined, metrics acquisition, and application-role profile in place, we can now begin detecting anomalies using the anomaly detection engine. The engine requires four components for this process;

- Application-Role definition with assigned workloads.
- Application-Role profile.
- Metrics published into the message bus.
- Rulepacks.

As the metrics are consumed by the anomaly detection engine, they are mapped to the corresponding application-role. Rulepacks assigned to that application-role enable the engine to selectively choose which feature of the application-role profile to match with the consumed metrics. Any metric attributes that do not match the selected profile feature are considered anomalies. Alerts are generated as a result of these anomalies.

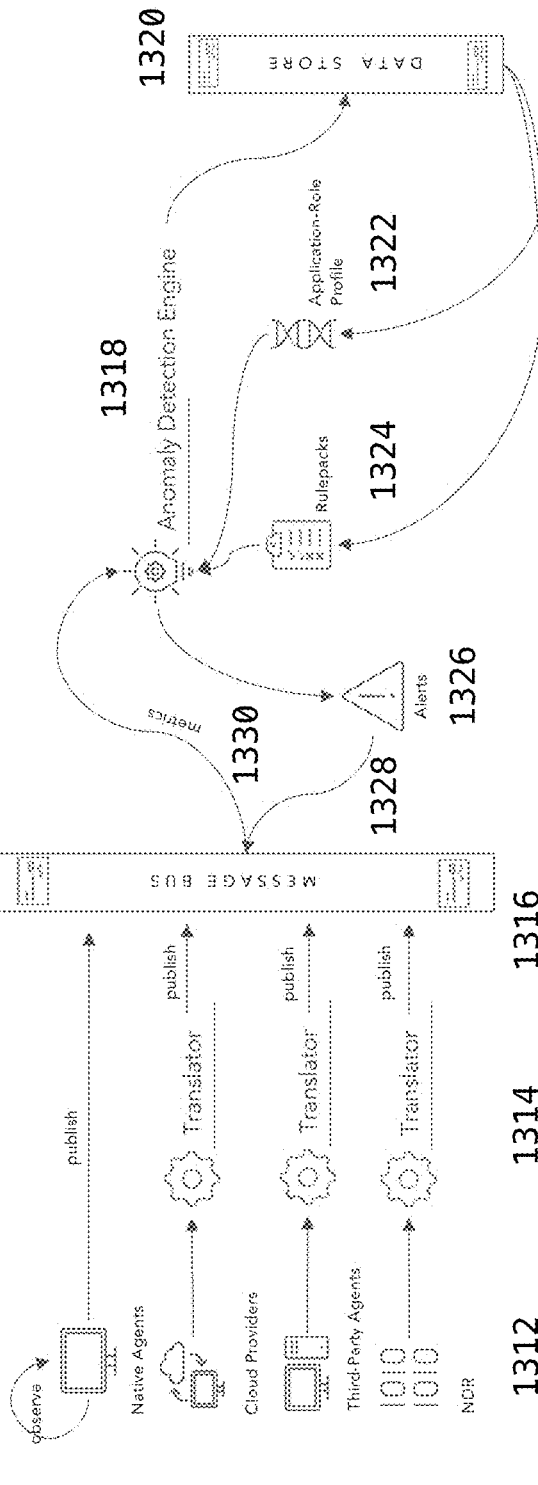

FIG. 14

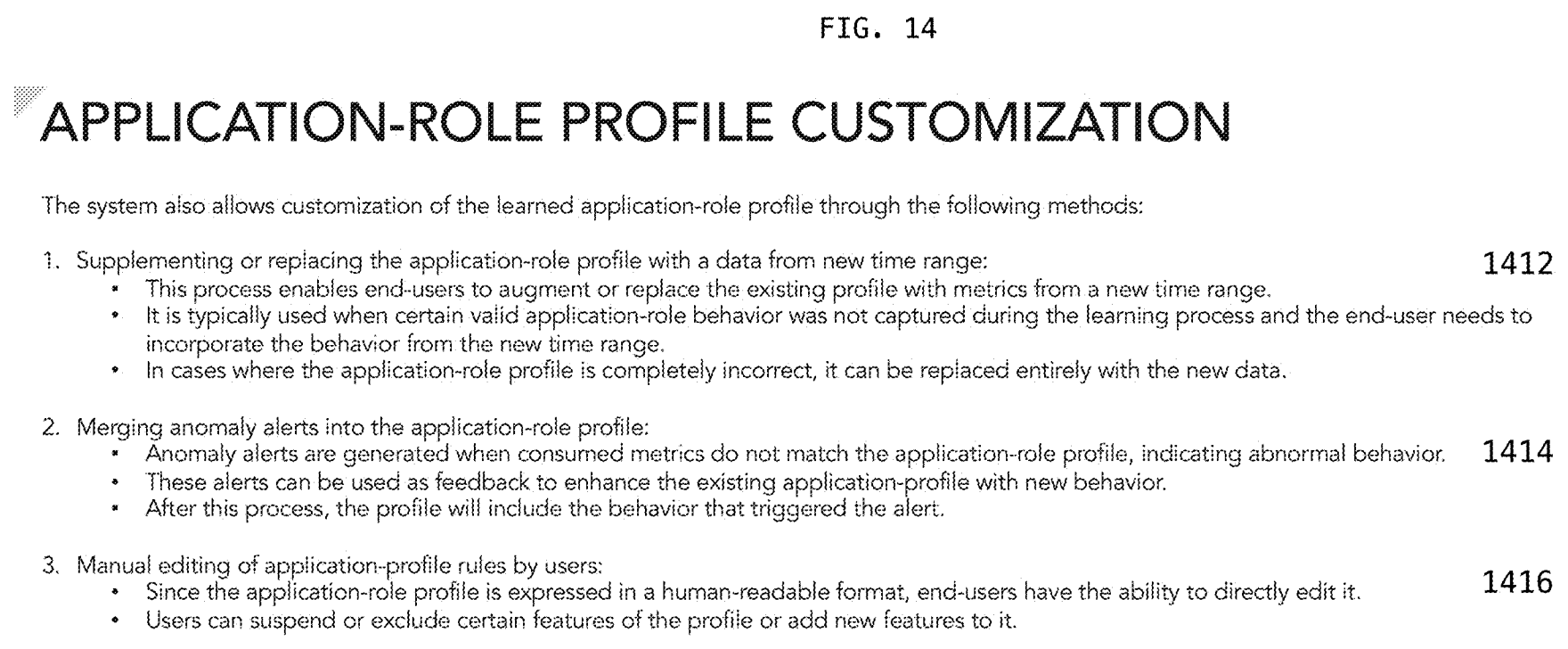

APPLICATION-ROLE PROFILE CUSTOMIZATION

The system also allows customization of the learned application-role profile through the following methods:

1. Supplementing or replacing the application-role profile with a data from new time range:     1412
   - This process enables end-users to augment or replace the existing profile with metrics from a new time range.
   - It is typically used when certain valid application-role behavior was not captured during the learning process and the end-user needs to incorporate the behavior from the new time range.
   - In cases where the application-role profile is completely incorrect, it can be replaced entirely with the new data.

2. Merging anomaly alerts into the application-role profile:     1414
   - Anomaly alerts are generated when consumed metrics do not match the application-role profile, indicating abnormal behavior.
   - These alerts can be used as feedback to enhance the existing application-profile with new behavior.
   - After this process, the profile will include the behavior that triggered the alert.

3. Manual editing of application-profile rules by users:     1416
   - Since the application-role profile is expressed in a human-readable format, end-users have the ability to directly edit it.
   - Users can suspend or exclude certain features of the profile or add new features to it.

FIG. 15 - a security process

| providing security platform in operative communication with one or more client computer networks; | 1512 |

| learning an application role profile by using native agent plugins to collect real-time time series application behavior workload telemetry (metrics) through a message bus to a central collector that consumes the telemetry metrics and persists them into a scalable data store, the metrics including network traffic, process, user activity, file integrity, installed software, network interface cars, system information, CPU/memory resource utilization, and file system; | 1514 |

| optionally obtaining metrics from public cloud providers, third-party agents, and NDR (Network Detection and Response) solutions, establishing a mapping between source metrics and equivalent metrics in the platform by assigning and transforming each attribute of the source metric to match the attributes of the native agent's metrics, wherein the mapping is carried out by a translator, each metric source having its own translator, wherein each translator is configured to acquire and identify metrics from their respective sources and map them to the system's equivalents, then once the metrics are translated into the native schema, they are published to the message bus, and the same process as the native agent's metrics is followed. | 1516 |

| after assigning workloads to the application-role construct and persisting historical metrics, initiating the Application-Role behavior learning process by providing the learning engine with the following learning engine data: Application, Role, start and end time, and the metric type for profiling; | 1518 |

| using the learning engine data, the learning engine performs the following steps: Iterating through all the workloads belonging to the specified Application- Role; Reading the persisted metrics data associated with the workloads within the specified time range; Tokenizing the attributes within the metrics data and identifying the pivot point for aggregation; Aggregating the metrics into time buckets; Identifying the attribute type within the metrics and applying a summarization method; Optionally, if applicable, match raw metric attribute values with stored classifiers for abstraction. | 1520 |

| presenting the resulting profiling in a human-readable format, providing format customization to end-users; and storing the results in the database as the profile for this Application-Role. | 1522 |

| detecting anomalies using the anomaly detection engine using the defined application-role, acquired metrics, and application-role profile, the anomaly detection engine requires four components for this process: Application-Role definition with assigned workloads; Application-Role profile; Metrics published into the message bus; and Rulepacks; wherein as the metrics are consumed by the anomaly detection engine, they are mapped to the corresponding application-role, wherein the Rulepacks assigned to that application-role enable the engine to selectively choose which feature of the application-role profile to match with the consumed metrics, wherein any metric attributes that do not match the selected profile feature are considered anomalies, and wherein Alerts are generated as a result of these anomalies. | 1524 |

FIG. 16 - a security platform an Anomaly Detection Engine (ADE) configured to assign workloads to an application-role construct and to persist historical metrics in a scalable data store by learning an application role profile using native agent plugins to collect real-time time series application behavior workload telemetry (native agent metrics) through a message bus to a central collector that consumes the native agent metrics and persists them into a scalable data store, the native agent metric attributes including network traffic, process, user activity, file integrity, installed software, network interface cars, system information, CPU/memory resource utilization, and file system; 1612

the Anomaly Detection Engine (ADE) configured to optionally obtain additional metrics from sources selected from public cloud providers, third-party agents, and NDR (Network Detection and Response) solutions, and the ADE configured to establish a mapping between native agent metric attributes and additional metric attributes by assigning and transforming each attribute of the additional metric to match the attributes of the native agent's metric attributes, wherein the mapping is carried out by a translator, each additional metric source having its own translator, wherein each translator is configured to acquire and identify additional metric attributes from their respective sources and map them to the equivalent native agent metric attributes, then once the additional metrics are translated into the native schema, the additional metrics are published to the message bus, and the same process as the native agent's metrics is performed. 1614

a Learning Engine configured to initiate the Application-Role behavior learning process by providing the Learning Engine with the following learning engine data: Application, Role, start and end time, and the metric type for profiling, the Learning Engine also configured to use the learning engine data to perform the following steps: Iterating through all the workloads belonging to the specified Application- Role; Reading the persisted metrics data associated with the workloads within the specified time range; Tokenizing the attributes within the metrics data and identifying the pivot point for aggregation; Aggregating the metrics into time buckets; Identifying the attribute type within the metrics and applying a summarization method; Optionally, if applicable, match raw metric attribute values with stored classifiers for abstraction. 1616

the ADE configured to present resulting profiling in a human-readable format, provide format customization to end-users, and store results in the scalable data store as an Application-Role profile; 1618

the ADE configured to detect anomalies using the defined application-role, acquired metrics, and application-role profile, the ADE configured to require four components for detecting anomalies: an Application-Role definition with assigned workloads Module; an Application-Role profile Module; a Metrics published into the message bus Module; and a Rulepacks Module; wherein as the metrics are consumed by the anomaly detection engine, they are mapped to the corresponding application-role, wherein the Rulepacks assigned to that application-role enable the engine to selectively choose which feature of the application-role profile to match with the consumed metrics, wherein any metric attributes that do not match the selected profile feature are considered anomalies, and wherein Alerts are generated as a result of these anomalies. 1620

FIG. 17 - a security platform for client computer networks an Anomaly Detection Engine (ADE) configured to compare real-time telemetry with a learned or defined application profile, wherein the telemetry is real-time streaming data feed from native agents, cloud workloads, third party agents, and agentless telemetry;  — 1712 an Application Behavior Profile (ABP) module in communication with the ADE, the ABP module configured to process known good application behavior features, wherein these features include: process behavior, identify behavior, network behavior, logins behavior, packages behavior, and file activity behavior;  — 1714 an Anomaly Event/Alert module in communication with the ADE, the Anomaly Event/Alert module configured to report any deviation of behavior, as detected by the ADE, as an alert;  — 1716 a Metrics Persistence module configured to perform application behavior profile learning by consuming the real-time telemetry from various sources and persisting in a Database (DB);  — 1718 an Application Profile Learning Engine (APL Engine) is configured to read persisted telemetries within a specified time range, wherein the APL Engine places telemetries in the application role context of the workload source, wherein telemetries are also compiled in time buckets, wherein the APL Engine uses customized syntactic pattern recognition approach to compile workload telemetries into application behavior profiles, wherein the ABP module stores application behavior profiles in Application Profile Definition (APD) format, wherein the APD format is configured to be user readable and editable;  — 1720 a Manual Application Profile Definition (MAPD) module configured to permit manual definition of application behavior profiles, and editing of learned behavior, the MAPD module is operatively connected to the Application Behavior Profile module, which stores manually defined application behavior profiles in the Application Profile Definition format;  — 1722 wherein the APD format permits the APD to be treated as code, wherein application behavior is part of an iterative release process, where application behavior can be updated, and wherein the the APD format is part of the QA/test process to check for application behavior deviation;  — 1724 a Merger module configured to take alerts and merge them to an application profile definition as a mechanism for fine tuning the APD and increasing sensitivity of the alert;  — 1726 wherein the APD is created by using a Telemetry Database, the APL Engine receives telemetries stored in the Telemetry Database, an application function/module places telemetry in the application context, a role function/module aggregates telemetries in the role for the workload source for that application, a profile type function/module groups the telemetries in time buckets, a schedule function/module groups telemetries with the schedule in the time buckets, and all of these functions are then added as telemetry attributes to the APD.  — 1728

FIG. 18 - a security process providing security platform in operative communication with one or more client computer networks; | 1812

comparing telemetry from real-time streaming data feed from native agents, cloud workloads, third party, and agentless, with a learned or defined application profile in an Anomaly Detection Engine; | 1814

processing known good application behavior features in an Application Behavior Profile module in operative communication with the Anomaly Detection Engine, the features include: process behavior, identify behavior, network behavior, logins behavior, packages behavior, and file activity behavior; | 1816

reporting any deviation of behavior, as detected by the Anomaly Detection Engine, as an alert, using an Anomaly Event/Alert module in operative communication with the Anomaly Detection Engine | 1818

performing application behavior profile learning in a Metrics Persistence module by consuming the real-time telemetry from various sources and persisting in a Database (DB); | 1820

in an Application Profile Learning Engine (module), reading persisted telemetries within a specified time range, placing telemetries in the application role context of workload source, compiling telemetries in time buckets, using a customized syntactic pattern recognition approach to compile workload telemetries into application behavior profiles, storing application behavior profiles in an Application Profile Definition (APD) format, the APD format configured to be user readable and editable; | 1822

permitting manual definition of application behavior profiles and editing learned behavior in Manual Application Profile Definition (MAPD) module, the MAPD module connected to the Application Behavior Profile module, which stores manually defined application behavior profiles in APD format; | 1824

configuring the Application Profile Definition (APD) format to be treated as code, wherein application behavior is part of an iterative release process, where application behavior is updated, and wherein the the APD format is part of the QA/test process to check for application behavior deviation; | 1826

taking alerts and merging them to an application profile definition in a Merger module as a mechanism for fine tuning the APD and increasing sensitivity of the alert; | 1828

wherein creating the APD uses a Telemetry Database for storing the telemetries, receiving telemetries stored in the Telemetry Database uses the APD Learning Engine, placing telemetry in application context uses an application function/module, aggregating telemetries in the role for workload source for that application uses a role function/module, grouping telemetries in time buckets uses a profile type function/module, grouping telemetries with the schedule in time buckets uses a schedule function/module, and adding these functions as telemetry attributes to the APD. | 1830

Figure 19:
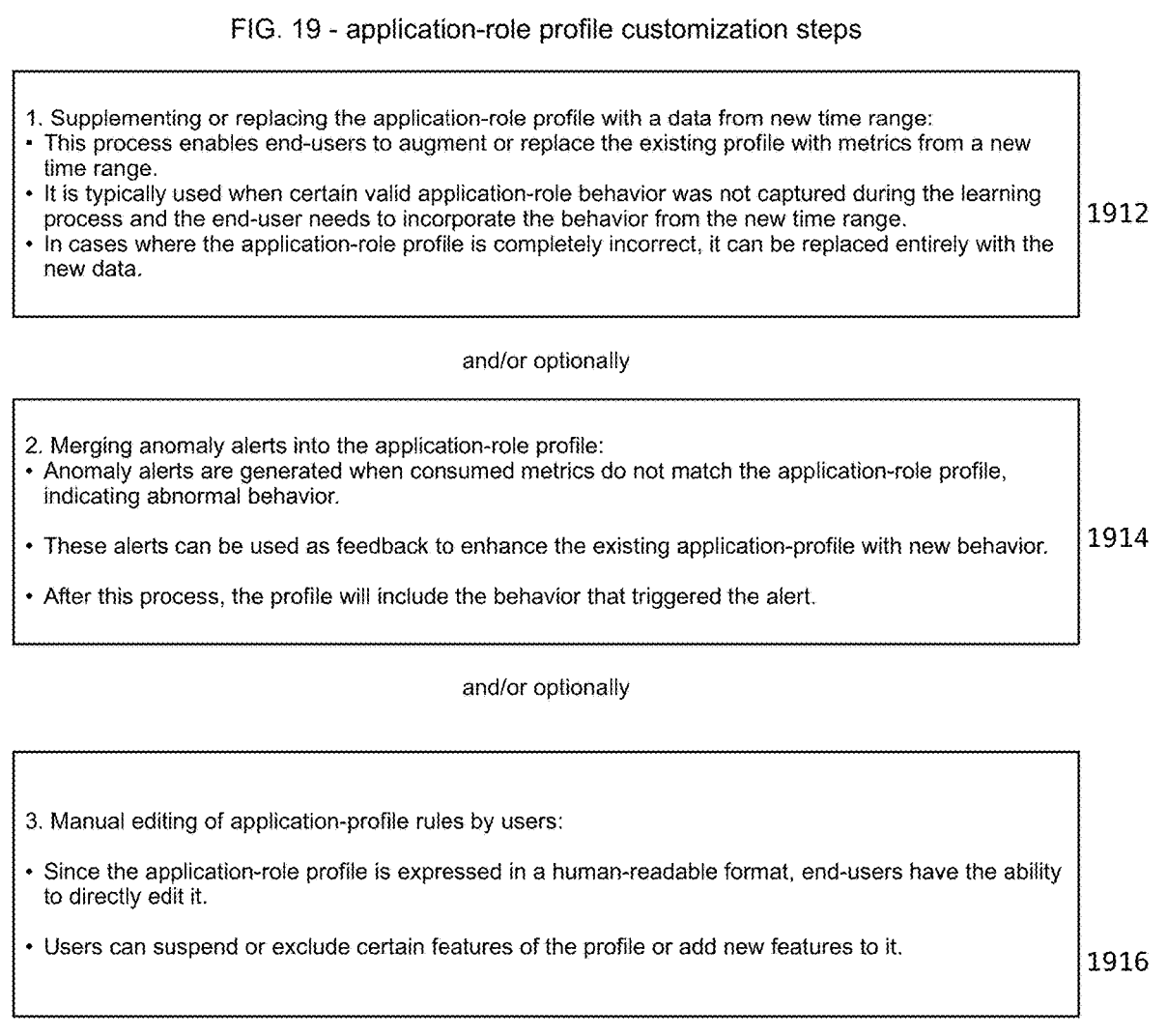

FIG. 19 - application-role profile customization steps

1. Supplementing or replacing the application-role profile with a data from new time range:
• This process enables end-users to augment or replace the existing profile with metrics from a new time range.
• It is typically used when certain valid application-role behavior was not captured during the learning process and the end-user needs to incorporate the behavior from the new time range.
• In cases where the application-role profile is completely incorrect, it can be replaced entirely with the new data.

1912 and/or optionally

2. Merging anomaly alerts into the application-role profile:
• Anomaly alerts are generated when consumed metrics do not match the application-role profile, indicating abnormal behavior.

• These alerts can be used as feedback to enhance the existing application-profile with new behavior.

• After this process, the profile will include the behavior that triggered the alert.

1914 and/or optionally

3. Manual editing of application-profile rules by users:

• Since the application-role profile is expressed in a human-readable format, end-users have the ability to directly edit it.

• Users can suspend or exclude certain features of the profile or add new features to it.

1916

APPLICATION PROFILE DEFINITION FOR CYBER BEHAVIORS

BACKGROUND

The invention relates to computer security, and specifically to a method and system for application profile definition (APD) modeling and expression for a cyber defense system based upon monitoring application behavior and comparing to the expected behavior in the APD.

Enterprise data breach or malicious attack on application services are an exponentially increasing problem. Traditional defense mechanisms using just malware detection, virus detection or perimeter fencing with firewalls are no longer adequate. Threat actors are becoming more motivated, sophisticated, and attack surface has increased due to influx of BYOD and IOT. Most data breaches are accomplished via internal compromises from either rogue employees, compromised networks or social engineering.

Determining whether a workload's behavior is normal or anomalous requires understanding the context behind its behavior. Without such context, attempting to solve this problem is futile. Simply matching the workload's behavior with known anomalous patterns does not identify a new anomalous behavior that is likely already emerging.

Effective measures are therefore needed to automatically define the expected behaviors of applications and develop a profile for each application within the enterprise. By defining expected behaviors (APDs) security teams can detect/thwart behavioral anomalies in real-time.

SUMMARY

The disclosure provides a system and method for the complete application profile definition (APD) modeling and expression for a cyber defense system based upon monitoring application behavior and comparing to the expected behavior in the APD. The system is designed with modularity in mind to accommodate flexible configuration. The system of components used in the method interoperate seamlessly.

The invention relates to computer security, and specifically to a method and system for defining the profile of expected application behaviors. According to one aspect, multiple application behavioral metric definitions are expressed for expected application interactions and state on a temporal basis. At least some of the behavioral definition metrics are expressed based on an association with an application profile or common entity. The expressed application profile definitions (APDs) are utilized to evaluate whether actual behavioral conditions specified by application profile white lists, policies and or security policies associated with the common entity have been satisfied. APDs are a defined set of metrics that can be expressed using the APD creator wizard or express using XLM, Json or any other software definition format. Responsive to evaluating that a APD behavioral condition has been deviated, an alert is generated and communicated to one or more response devices associated with the common entity.

In another aspect, the invention provides modules for various components, including, in sequence, an Application-Role definition module, a Telemetry Acquisition module, an Application-Role Behavior learning module, an Application-Role Behavior anomaly detection module, and an Application-Role Profile customization module.

BRIEF DESCRIPTION OF THE DRAWINGS

FIG. 6 is a schematic diagram and depicts an illustrative model on how Application Profile Definition (APD) is created, according to the present invention.

FIG. 7 is a schematic diagram and depicts application role definition, according to the present invention.

FIG. 8 is a schematic diagram and depicts metric source, generation and acquisition, as a foundation for learning the application role profile, according to the present invention.

FIG. 9 is a schematic diagram and depicts metric source, generation and acquisition using metrics from sources other than using workloads with native agents, according to the present invention.

FIG. 10 is a schematic diagram and depicts application-role behavior learning, according to the present invention.

FIG. 11 is a schematic diagram and depicts an illustration of a GUI screen of an application profile definition and shows a sample network behavior profile for an application role in a human readable format, according to the present invention.

FIG. 12 is a schematic diagram and depicts an illustration of a GUI screen of an application profile definition and shows a sample of process behavior profile for an application role in a human readable format, according to the present invention.

FIG. 13 is a schematic diagram and depicts application-profile anomaly detection using using the anomaly detection engine. The engine requires four components for this process: an Application-Role definition with assigned workloads module; an Application-Role profile module; a module for Metrics published into the message bus; and a Rulepacks module, according to the present invention.

FIG. 14 is a schematic diagram and depicts application-role profile customization by supplementing or replacing the application-role profile with data from a new time range, merging anomaly alerts into the application-role profile, and manually editing application-profile rules, according to the present invention.

FIG. 15 is a flowchart and depicts one preferred non-limiting embodiment of a security process, according to the present invention.

FIG. 16 is a schematic and depicts one preferred non-limiting embodiment of a security platform or security system, according to the present invention.

FIG. 17 is a schematic and depicts another preferred non-limiting embodiment of a security platform or security system, according to the present invention.

FIG. 18 is a schematic and depicts another preferred non-limiting embodiment of a security process, according to the present invention.

FIG. 19 is a schematic and depicts a preferred non-limiting embodiment of application-role profile customization steps for a security process, according to the present invention.

DETAILED DESCRIPTION OF THE INVENTION

Figure 1:
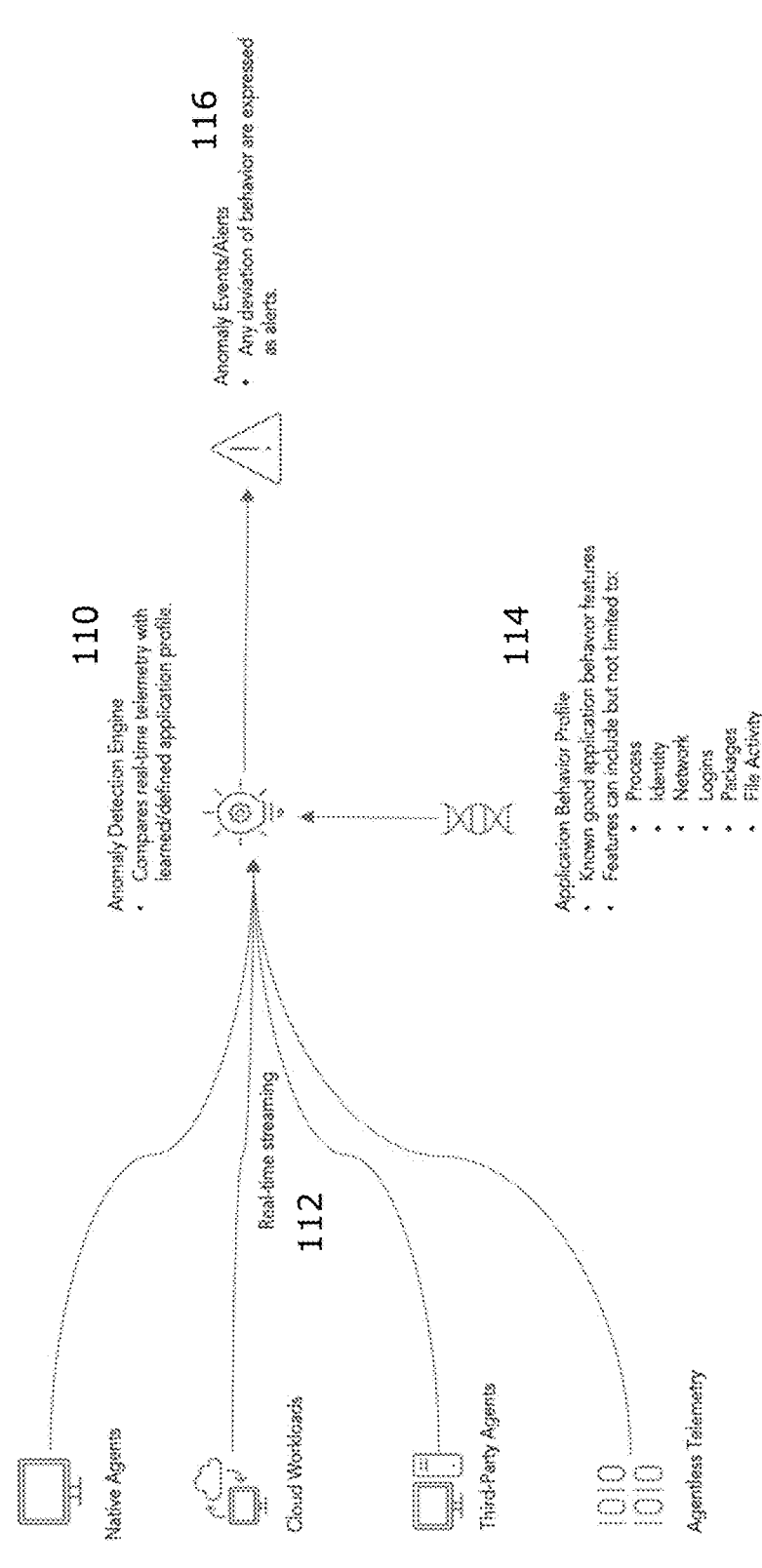
FIG. 1 is a schematic diagram and depicts an illustrative model of how an application behavior profile anomaly works, according to the present invention.

Embodiments disclosed and described herein are directed to a security process, comprising the steps:

providing security platform in operative communication with one or more client computer networks;

learning an application role profile by using native agent plugins to collect real-time time series application behavior workload telemetry (metrics) through a message bus to a central collector that consumes the telemetry metrics and persists them into a scalable data store, the metrics including network traffic, process, user activity, file integrity, installed software, network interface cars, system information, CPU/memory resource utilization, and file system;

optionally obtaining metrics from public cloud providers, third-party agents, and NDR (Network Detection and Response) solutions, establishing a mapping between source metrics and equivalent metrics in the platform by assigning and transforming each attribute of the source metric to match the attributes of the native agent's metrics, wherein the mapping is carried out by a translator, each metric source having its own translator, wherein each translator is configured to acquire and identify metrics from their respective sources and map them to the system's equivalents, then once the metrics are translated into the native schema, they are published to the message bus, and the same process as the native agent's metrics is followed;

after assigning workloads to the application-role construct and persisting historical metrics, initiating the Application-Role behavior learning process by providing the learning engine with the following learning engine data: Application, Role, start and end time, and the metric type for profiling;

using the learning engine data, the learning engine performing the following steps: Iterating through all the workloads belonging to the specified Application-Role; Reading the persisted metrics data associated with the workloads within the specified time range; Tokenizing the attributes within the metrics data and identifying the pivot point for aggregation; Aggregating the metrics into time buckets; Identifying the attribute type within the metrics and applying a summarization method; Optionally, if applicable, match raw metric attribute values with stored classifiers for abstraction;

presenting the resulting profiling in a human-readable format, providing format customization to end-users; and storing the results in the database as the profile for this Application-Role;

detecting anomalies using the anomaly detection engine using the defined application-role, acquired metrics, and application-role profile, the anomaly detection engine requires four components for this process: Application-Role definition with assigned workloads; Application-Role profile; Metrics published into the message bus; and Rulepacks; wherein as the metrics are consumed by the anomaly detection engine, they are mapped to the corresponding application-role, wherein the Rulepacks assigned to that application-role enable the engine to selectively choose which feature of the application-role profile to match with the consumed metrics, wherein any metric attributes that do not match the selected profile feature are considered anomalies, and wherein Alerts are generated as a result of these anomalies.

Embodiments disclosed and described herein are also directed to a security platform, comprising:

an Anomaly Detection Engine (ADE) configured to assign workloads to an application-role construct and to persist historical metrics in a scalable data store by learning an application role profile using native agent plugins to collect real-time time series application behavior workload telemetry (native agent metrics) through a message bus to a central collector that consumes the native agent metrics and persists them into a scalable data store, the native agent metric attributes including network traffic, process, user activity, file integrity, installed software, network interface cars, system information, CPU/memory resource utilization, and file system;

the Anomaly Detection Engine (ADE) configured to optionally obtain additional metrics from sources selected from public cloud providers, third-party agents, and NDR (Network Detection and Response) solutions, and the ADE configured to establish a mapping between native agent metric attributes and additional metric attributes by assigning and transforming each attribute of the additional metric to match the attributes of the native agent's metric attributes, wherein the mapping is carried out by a translator, each additional metric source having its own translator, wherein each translator is configured to acquire and identify additional metric attributes from their respective sources and map them to the equivalent native agent metric attributes, then once the additional metrics are translated into the native schema, the additional metrics are published to the message bus, and the same process as the native agent's metrics is performed;

a Learning Engine configured to initiate the Application-Role behavior learning process by providing the Learning Engine with the following learning engine data: Application, Role, start and end time, and the metric type for profiling, the Learning Engine also configured to use the learning engine data to perform the following steps: Iterating through all the workloads belonging to the specified Application-Role; Reading the persisted metrics data associated with the workloads within the specified time range; Tokenizing the attributes within the metrics data and identifying the pivot point for aggregation; Aggregating the metrics into time buckets; Identifying the attribute type within the metrics and applying a summarization method; Optionally, if applicable, match raw metric attribute values with stored classifiers for abstraction;

the ADE configured to present resulting profiling in a human-readable format, provide format customization to end-users, and store results in the scalable data store as an Application-Role profile;

the ADE configured to detect anomalies using the defined application-role, acquired metrics, and application-role profile, the ADE configured to require four components for detecting anomalies: an Application-Role definition with assigned workloads Module; an Application-Role profile Module; a Metrics published into the message bus Module; and a Rulepacks Module; wherein as the metrics are consumed by the anomaly detection engine, they are mapped to the corresponding application-role, wherein the Rulepacks assigned to that application-role enable the engine to selectively choose which feature of the application-role profile to match with the consumed metrics, wherein any metric attributes that do not match the selected profile feature are considered anomalies, and wherein Alerts are generated as a result of these anomalies.

Embodiments disclosed and described herein are directed to a system, comprising:

a security platform having programming instructions executable on a processor configured to effect, by the security platform in operative communication with one or more client computer networks, an Anomaly Detection Engine (module) configured to compare real-time telemetry with a learned or defined application profile, wherein the telemetry is real-time streaming data feed from native agents, cloud workloads, third party agents, and agentless telemetry;

an Application Behavior Profile module in operative communication with the Anomaly Detection Engine, the Application Behavior Profile module configured to process known good application behavior features, wherein these features include: process behavior, identify behavior, network behavior, logins behavior, packages behavior, and file activity behavior;

an Anomaly Event/Alert module in operative communication with the Anomaly Detection Engine, the Anomaly Event/Alert module configured to report any deviation of behavior, as detected by the Anomaly Detection Engine, as an alert;

a Metrics Persistence module configured to perform application behavior profile learning by consuming the real-time telemetry from various sources and persisting in a Database (DB);

an Application Profile Learning Engine (module) is configured to read persisted telemetries within a specified time range, wherein the Application Profile Learning Engine places the telemetries in the application role context of the workload source, wherein the telemetries are also compiled in time buckets, wherein the Application Profile Learning Engine uses a customized syntactic pattern recognition approach to compile workload telemetries into application behavior profiles, wherein the Application Behavior Profile module stores application behavior profiles in an Application Profile Definition (APD) format, wherein the APD format is configured to be user readable and editable;

a Manual Application Profile Definition (MAPD) module configured to permits manual definition of application behavior profiles, and editing of learned behavior, the MAPD module is operatively connected to the Application Behavior Profile module, which stores manually defined application behavior profiles in the Application Profile Definition format;

wherein the Application Profile Definition (APD) format permits the APD to be treated as code, wherein application behavior is part of an iterative release process, where application behavior can be updated, and wherein the the APD format is part of the QA/test process to check for application behavior deviation;

a Merger module configured to take alerts and merge them to an application profile definition as a mechanism for fine tuning the APD and increasing sensitivity of the alert;

wherein the Application Profile Definition (APD) is created by using a Telemetry Database used for storing the telemetries, the APD Learning Engine is configured to receive telemetries stored in the Telemetry Database, wherein an application function/module places the telemetry in the application context, wherein a role function/module aggregates the telemetries in the role for the workload source for that application, wherein a profile type function/module groups the telemetries in time buckets, wherein a schedule function/module groups the telemetries with the schedule on the time bucket, and wherein these functions are then added as telemetry attributes to the APD.

Embodiments described herein are also directed to a method, comprising the steps:

In a security platform having programming instructions executable on a processor configured to effect, by the security platform in operative communication with one or more client computer networks, comparing real-time telemetry with a learned or defined application profile in an Anomaly Detection Engine (module), wherein the telemetry is real-time streaming data feed from native agents, cloud workloads, third party agents, and agentless telemetry;

processing known good application behavior features in an Application Behavior Profile module in operative communication with the Anomaly Detection Engine, wherein these features include: process behavior, identify behavior, network behavior, logins behavior, packages behavior, and file activity behavior;

reporting any deviation of behavior, as detected by the Anomaly Detection Engine, as an alert, using an Anomaly Event/Alert module in operative communication with the Anomaly Detection Engine;

performing application behavior profile learning in a Metrics Persistence module by consuming the real-time telemetry from various sources and persisting in a Database (DB);

in an Application Profile Learning Engine (module), reading persisted telemetries within a specified time range, placing the telemetries in the application role context of the workload source, compiling the telemetries in time buckets, using a customized syntactic pattern recognition approach to compile workload telemetries into application behavior profiles, storing application behavior profiles in an Application Profile Definition (APD) format, wherein the APD format is configured to be user readable and editable;

permitting manual definition of application behavior profiles and editing of learned behavior in a Manual Application Profile Definition (MAPD) module, the MAPD module is operatively connected to the Application Behavior Profile module, which stores manually defined application behavior profiles in the Application Profile Definition format;

wherein the Application Profile Definition (APD) format permits the APD to be treated as code, wherein application behavior is part of an iterative release process, where application behavior can be updated, and wherein the the APD format is part of the QA/test process to check for application behavior deviation;

taking alerts and merging them to an application profile definition in a Merger module as a mechanism for fine tuning the APD and increasing sensitivity of the alert;

wherein creating the Application Profile Definition (APD) uses a Telemetry Database used for storing the telemetries, wherein receiving telemetries stored in the Telemetry Database uses the APD Learning Engine, wherein placing the telemetry in the application context uses an application function/module, wherein aggregating the telemetries in the role for the workload source for that application uses a role function/module, wherein grouping the telemetries in time buckets uses a profile type function/module, wherein grouping the telemetries with the schedule on the time bucket uses a schedule function/module, and adding these functions as telemetry attributes to the APD.

Embodiments described herein are also directed to a zero trust, cloud-to-ground application environment protection platform. The invention applies zero trust principles to protecting the application environment. The invention intelligently defines adaptive security profiles for all applications and workloads based on their runtime behavior—not static rules—and adapts the protection continuously. The invention also monitors and enforces compliance continuously and in real-time, for continuous protection. And, the invention alone unifies application security data across a full range of modern cloud, hybrid, virtualized, containerized and traditional enterprise environments.

The invention provides a cybersecurity platform that analyzes, alerts and responds with high-speed low-latency performance that commercial platforms demand. The invention performs at sub-second speed, high volume, and massive scale for a dynamic enterprise application environment.

The invention is APP-FIRST—it reverses the model by starting from the app perspective. The invention continually consumes and analyzes real-time telemetry with a behavioral analytics engine that is optimized for performance and tuned to how apps operate. With continuous behavioral monitoring, security policy matches app reality, and provides the means to target vulnerabilities, detect anomalies, adapt policy to dynamic operational changes, and respond on-demand.

The invention platform uses an appliance-sensor architecture and deploys as a virtual machine on-premises or in public/hybrid/multi-cloud environments. The invention is configured for scale, high performance, and as an extensible, open platform for integration across security and infrastructure management solutions.

The invention uses a load-balancing, n+1 appliance clustering. The invention provides a multi-tenant platform with role-based management. The invention is REST API-driven and is export-ready to SIEM, SOAR, SAP.

Any of the systems or methods disclosed herein may include a Security Agent with a light footprint to deliver full-stack, application and cloud workload protection. The Security Agent actively monitors and enforces on over 115 parameters, streams and pushes differential data updates on configurable schedules, and alerts in real-time.

Any of the systems or methods disclosed herein may include an agentless security by using live telemetry from agent deployments of well-known EPP/EDR platforms. In this embodiment, the invention provides improved risk posture, protection and compliance within hours or days without the duplicate costs and deployment pain of typical 'app-centric' solutions.

The invention unifies capabilities supporting visibility, control, and response, helping organizations modernize security for their application environments by incorporating zero trust strategies.

The invention's approach to microsegmention is based on a deep, comprehensive understanding of the behavior of application workloads.

Any of the systems or methods disclosed herein may be deployed in on-premises data centers, cloud, hybrid, and containerized environments, as well as in a hosted version of the platform. The invention's approach to microsegmention is based on a deep, comprehensive understanding of the behavior of application workloads. The platform uses machine learning and advanced behavior analytics to assess 160 unique application runtime parameters and build a complete view of applications and workloads across cloud and on-premises environments. These inputs are used to develop an Application Trust Profile for each application and workload, which is continuously updated and used to determine which behaviors should be authorized and which fall outside the baseline and should trigger an alert or be automatically blocked. These recommendations can then be automatically deployed to enforce microsegmentation policies, which are updated in real time based on changes to application behaviors, vulnerabilities, or threat profiles. The result of this approach is more accurate segmentation policies, helping organizations reduce time to value, limit errors and the resulting negative business impacts, and lower ongoing operational costs.

Integration with Cloud-Based Endpoint Protection Platforms

Any of the systems or methods disclosed herein may be combined with third party cloud-based endpoint protection platforms. The invention supports deployment flexibility by allowing organizations to use the lightweight agent or utilize agents of technology partners to take advantage of existing deployments. A partner ecosystem permits expansion through a platform integration with a cloud-based endpoint protection platform, which enables customers to enforce microsegmentation policies managed by the invention, through cloud-based endpoint protection platform agents. Telemetry collected by cloud-based endpoint protection platforms is automatically and continuously fed to the invention platform and used as an additional input into the Application Trust Profile. Customers can then choose to automatically generate microsegmentation policies that are sent back to the cloud-based endpoint protection platform and enforced through the native firewalls on host servers. By enabling organizations to use already deployed agents to support microsegmentation initiatives, the invention can help customers significantly reduce time to value, improve security, and accelerate their journey to the cloud.

Application environments have changed dramatically since the first microsegmentation tools were introduced ten years ago. Environments are more distributed and dynamic than ever, microservices-based architectures are commonplace, and attackers are more motivated than ever before to target these valuable resources. For all these reasons, microsegmentation should be a critical component to every organization's zero trust application security strategy—and yet it remains underutilized. This is not because organizations struggle to see the value microsegmentation can provide, but because many microsegmentation tools do not have the capabilities required to effectively protect modern environments. The invention's intelligent workload segmentation provides a new approach to help organizations improve their application security posture. When coupled with a cloud-based endpoint protection platform, an organization gains flexibility, additional telemetry, and improved time to value.

The term "zero trust", as used herein, refers to a set computer security principles and practices. A non-limiting list of zero trust features includes:

Devices on network—identified and inventoried

Authentication—2FA+

Monitor network for anomalous activity, require 2FA or restrict access for questionable Match data type and sensitivity to users Conditional access Least-privileged access (LPA) model, only use minimum level of access for job Remote access by application only, not for entire network Device health & posture pre-check before connection Segment & secure the cloud network.

Referring now to the figures, the schematics illustrate components for the modeling and expression of APDs. The present disclosure is illustrated by way of example and not limited in the accompanying figures in which like reference numerals indicate similar elements.

FIG. 1 depicts an illustrative model of how an application behavior profile anomaly works. FIG. 1 shows how an Anomaly Detection Engine (module) 110 compares real-time telemetry with a learned or defined application profile. The telemetry 112 is real-time streaming data feed from native agents, cloud workloads, third party agents, and agentless telemetry. An Application Behavior Profile module 114 includes known good application behavior features. These features can include but are not limited to: process behavior, identify behavior, network behavior, logins behavior, packages behavior, and file activity behavior. An Anomaly Event/Alert module 116 reports any deviation of behavior, as detected by the Anomaly Detection Engine 110, as an alert.

Figure 2:
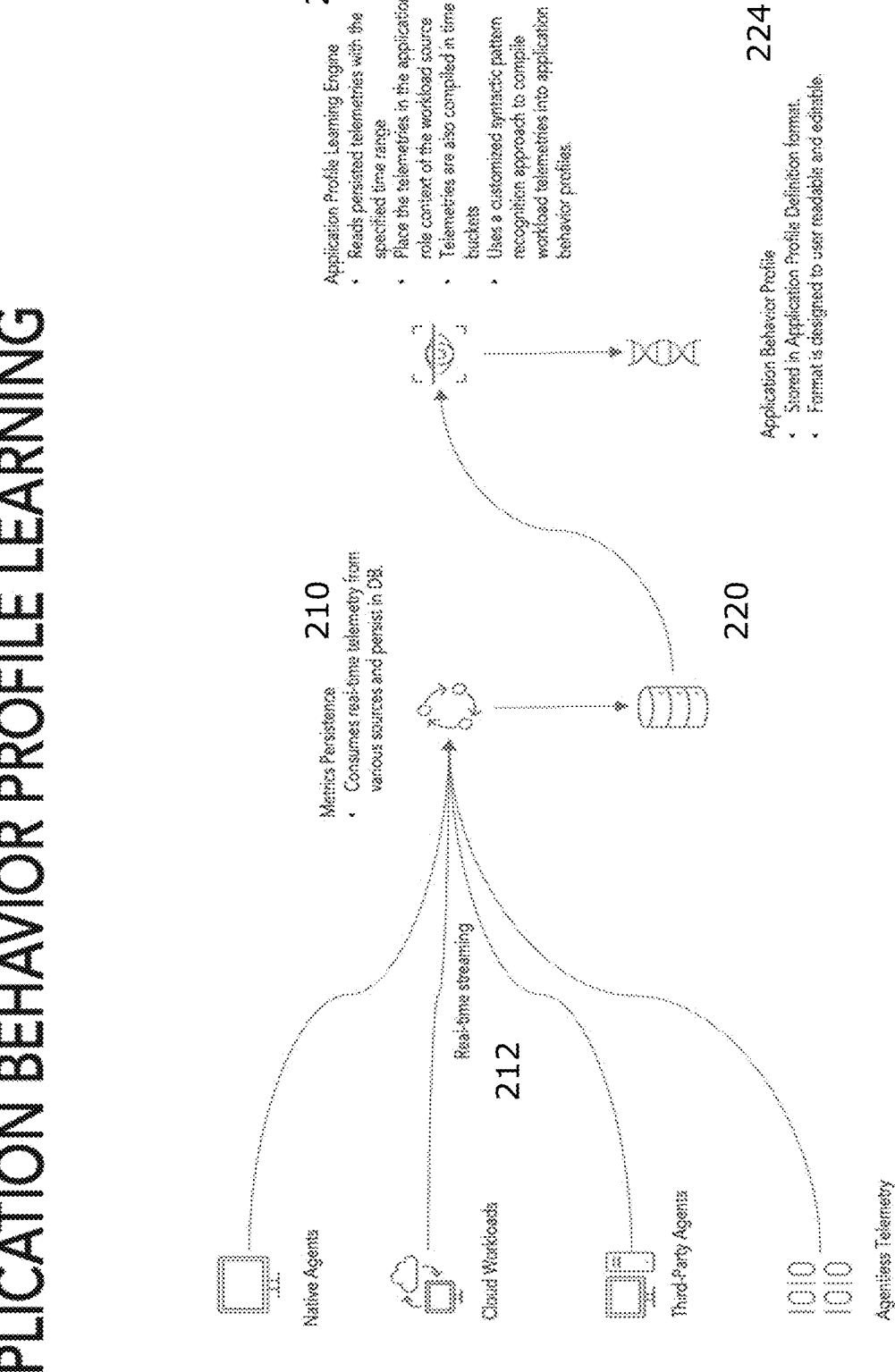
FIG. 2 is a schematic diagram and depicts an illustrative model on how application behavior profile learning is done, according to the present invention.

FIG. 2 depicts an illustrative model on how application behavior profile learning is done. FIG. 2 shows a Metrics Persistence module 210 that consumes real-time telemetry from various sources and persists in Database (DB) 220. The real-time telemetry 212 is a streaming data feed from native agents, cloud workloads, third party agents, and agentless telemetry. An Application Profile Learning Engine (module) 222 reads persisted telemetries within a specified time range. The Application Profile Learning Engine 222 then places the telemetries in the application role context of the workload source. The telemetries are also compiled in time buckets. The Application Profile Learning Engine 222 uses a customized syntactic pattern recognition approach to compile workload telemetries into application behavior profiles. An Application Behavior Profile module 224 stores application behavior profiles in an Application Profile Definition format. The APD format is configured to be user readable and editable.

Figure 3:
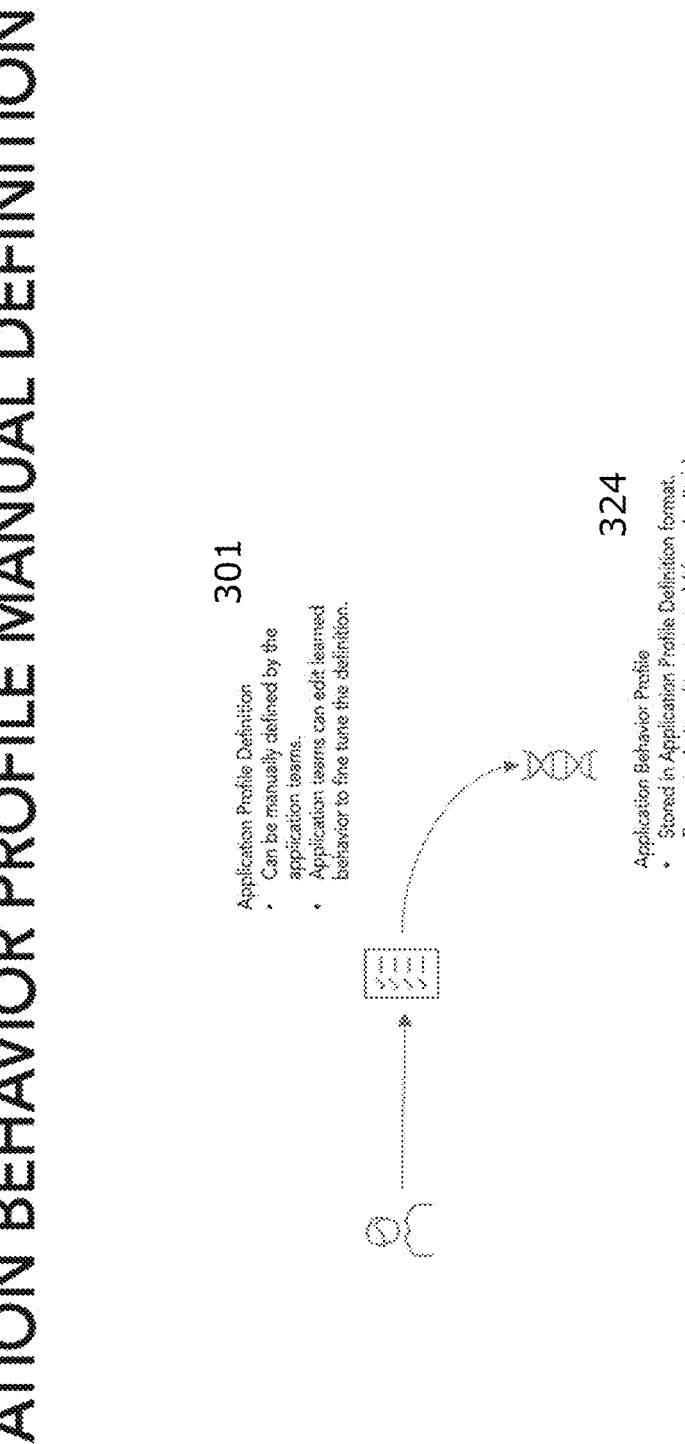
FIG. 3 is a schematic diagram and depicts an Application Profile Definition (APD) manual definition, according to the present invention.

FIG. 3 depicts an Application Profile Definition (APD) manual definition 301. FIG. 3 shows a Manual Application Profile Definition module that permits manual definition of application behavior profiles, and also permits editing of learned behavior. Editing learned behaviors permits fine tuning of a definition. The MAPD is operatively connected to the Application Behavior Profile module 324, which stores application behavior profiles in an Application Profile Definition format. The APD format is configured to be user readable and editable.

Figure 4:
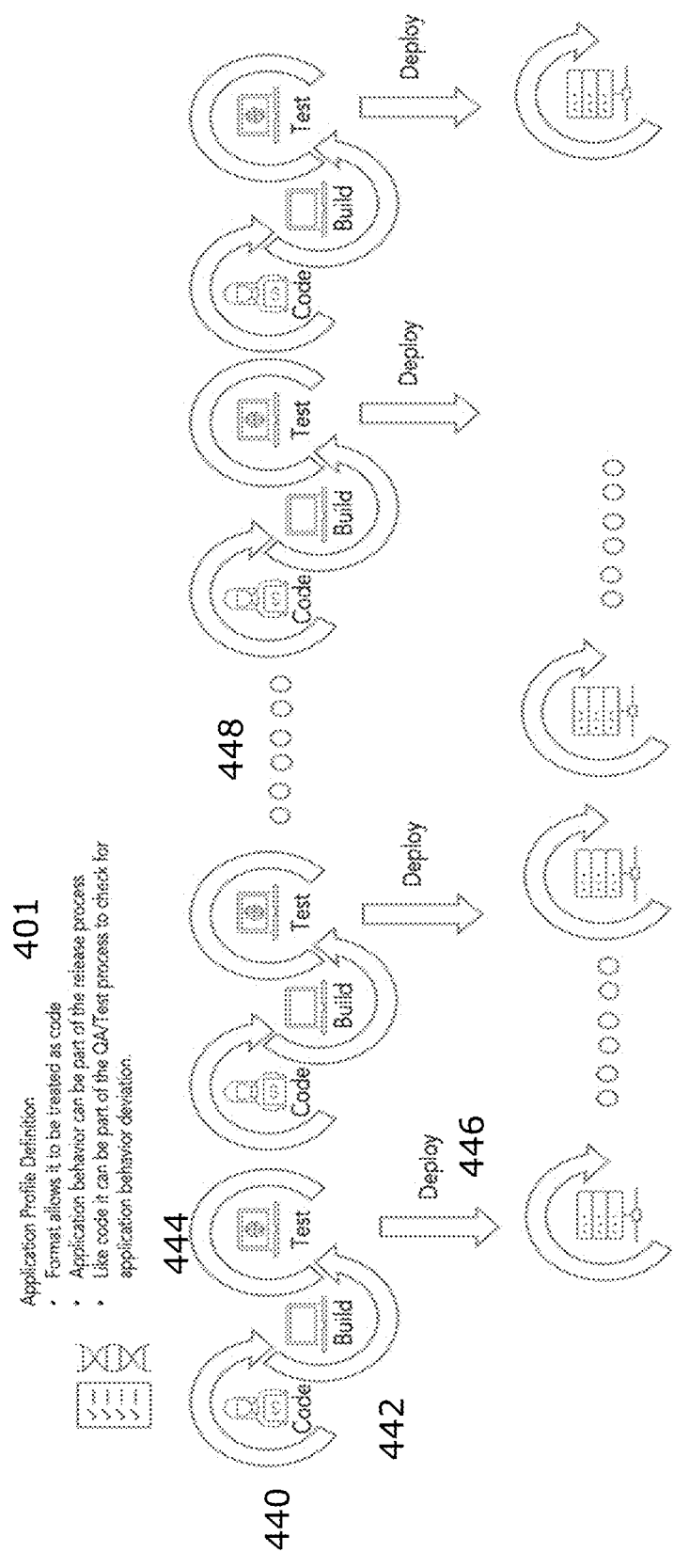
FIG. 4 is a schematic diagram and depicts how an Application Profile Definition (APD) can be part of a software development process, according to the present invention.

FIG. 4 depicts how an Application Profile Definition (APD) 401 can be part of a software development process. FIG. 4 shows how an Application Profile Definition format 401 permits the APD to be treated as code. The invention uses an Iterative Release module 448 to manage this process. In this way, the application behavior 442 can be part of an iterative release process 446, where application behavior can be updated. Since the APD format functions like code 440, it can be part of the QA/test process 444 to check for application behavior deviation.

Figure 5:
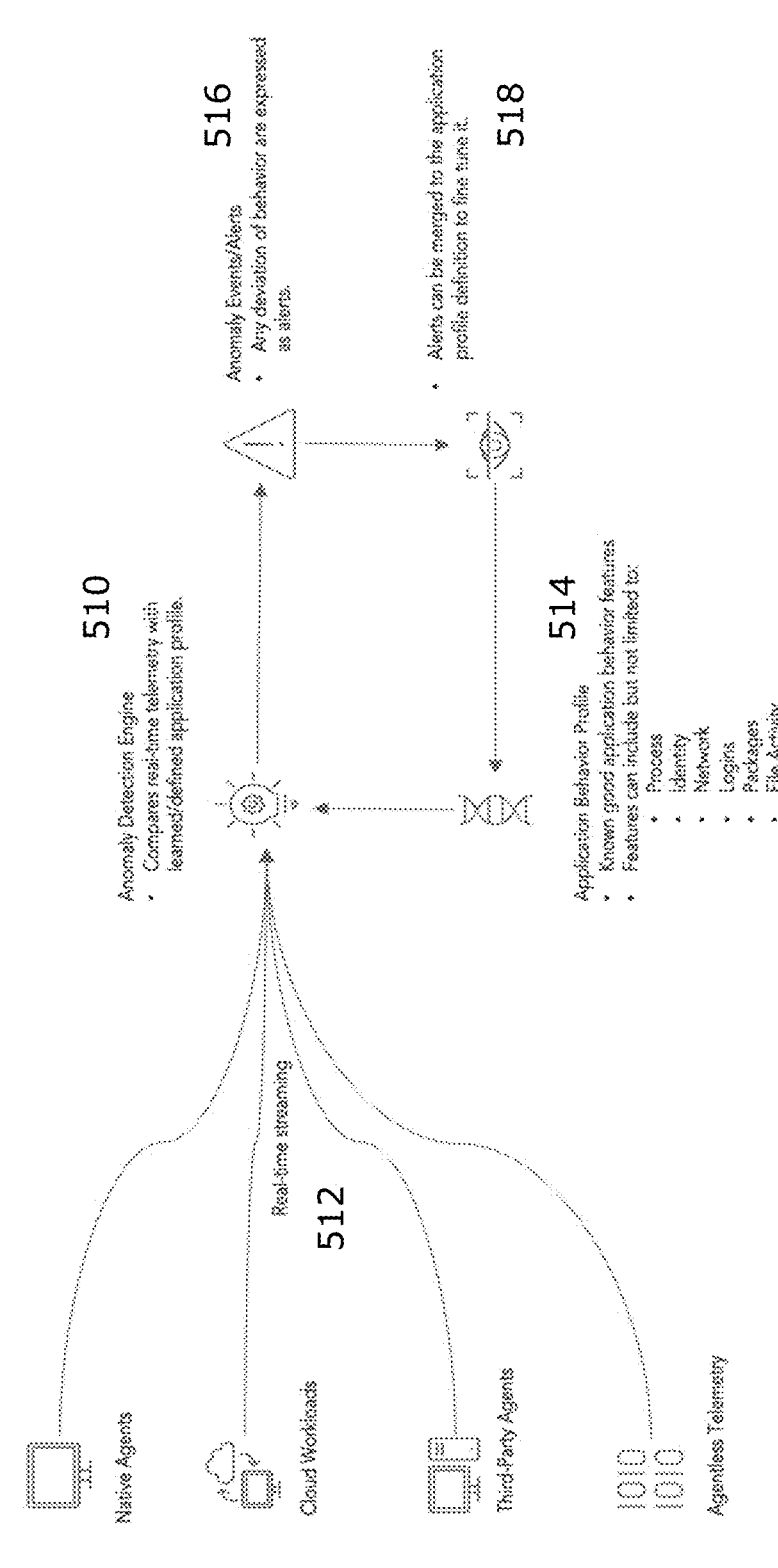
FIG. 5 is a schematic diagram and depicts how an Application Profile Definition (APD) can be fine tune by merging anomalies, according to the present invention.

FIG. 5 depicts how an Application Profile Definition (APD) can be fine tuned by merging anomalies. FIG. 5 shows how an Anomaly Detection Engine (module) 510 compares real-time telemetry 512 with a learned or defined application profile. The telemetry is real-time streaming data feed 512 from native agents, cloud workloads, third party agents, and agentless telemetry. An Application Behavior Profile 514 module includes known good application behavior features. These features can include but are not limited to: process behavior, identify behavior, network behavior, logins behavior, packages behavior, and file activity behavior. An Anomaly Event/Alert module 516 reports any deviation of behavior, as detected by the Anomaly Detection Engine 510, as an alert. A Merger module 518 takes alerts and merges them to the application profile definition as a mechanism for fine tuning the APD and increasing sensitivity of the alert.

FIG. 6. depicts an illustrative model on how Application Profile Definition (APD) is created. FIG. 6 shows a Telemetry Database 612 used for storing the telemetries captured in the invention. An APD Learning Engine 622 receives telemetries stored in the DB, and performs a series of functions. An application function/module 650 places the telemetry in the application context. A role function/module 652 aggregates the telemetries in the role for the workload source for that application. A profile type function/module 564 groups the telemetries in time buckets. And a schedule function/module 656 groups the telemetries with the schedule on the time bucket. These functions are then added as telemetry attributes 658, as shown.

FIG. 7 depicts a schematic diagram and depicts application role definition. To detect application behavior anomalies, the first step is to group workloads 714 into roles 716, 718, 720 that serve a common function within the application. These roles define specific functions or services provided by the workloads. An application refers to a computer program or set of programs designed for specific tasks or functionality, serving purposes such as productivity, entertainment, communication, or data management. Workloads, in the context of applications, are computer systems or components that provide resources, services, or functionality to other devices over a network. They manage tasks, network resources, and facilitate communication between devices. To group workloads, information can be sourced from CMDB-like databases or machine learning techniques can be applied to cluster workloads with similar behavior.

FIG. 8 depicts a schematic diagram and depicts metric source, generation and acquisition, as a foundation for learning the application role profile. The next step is to acquire metric data that will serve as the foundation for learning the application role profile. These metrics are sourced from the workloads 812 and represent a time series data, consisting of observations or data points recorded, measured, or collected at regular intervals over a period of time. They provide essential insights into the behavior of a workload. The system employs a native agent implementation with plugins 820 to observe various behaviors, including: Network Traffic; Process; Who (User activity); File Integrity; Installed Software; Network Interface Cards; System Information; CPU/Memory Resource Utilization; and File System. Each of these observation points follows a predefined schema. The observations are detected in real-time, collected over a period, and transmitted to a central collector 816 through a message bus 814. The central collector 816 then consumes these metrics and persists them into a highly scalable data store 818.

FIG. 9 depicts a schematic diagram and depicts metric source, generation and acquisition using metrics from sources 912 other than using workloads with native agents. In addition to using workloads with native agents, the system can also obtain metrics from various other sources.

These sources 912 include public cloud providers, third-party agents, and NDR (Network Detection and Response) solutions. For each of these sources, a mapping between the source metrics and the equivalent metrics in the system is established. This involves assigning and transforming each attribute of the source metric to match the attributes of the native agent's metrics. These mappings are carried out by translators 914, specific to each metric source 912. Each translator 914 is designed to acquire and identify metrics from their respective sources 912 and map them to the system's equivalents. Once the metrics are translated into the native schema, they are published to the message bus 916, and the same process as the native agent's metrics is followed through the collector 918 ad on to the data store 920.

FIG. 10 depicts a schematic diagram and depicts application-role behavior learning. Once the workloads are assigned to the application-role construct and historical metrics are persisted, the Application-Role 1020 behavior learning process can begin. To initiate the learning process, a user can provide the learning engine 1018 with the following information: Application 1012, Role 1014, start and end time 1016, and the metric type 1024 for profiling. Based on this data, the learning engine 1018 will perform the following steps. First, iterate through all the workloads belonging to the specified Application-Role 1020. Next, read the persisted metrics data 1024 associated with the workloads within the specified time range. Next, tokenize the attributes within the metrics data and identify the pivot point for aggregation. Next, aggregate the metrics into time buckets. Next, identify the attribute type within the metrics and apply suitable summarization methods accordingly. And, optionally, if applicable, match raw metric attribute values with stored classifiers for abstraction. The resulting profiling 1020 will be presented in a human-readable format, allowing end-users to customize it as needed. Finally, the results will be stored in the database 1022 as the profile for this Application-Role 1020.

Figure 11:
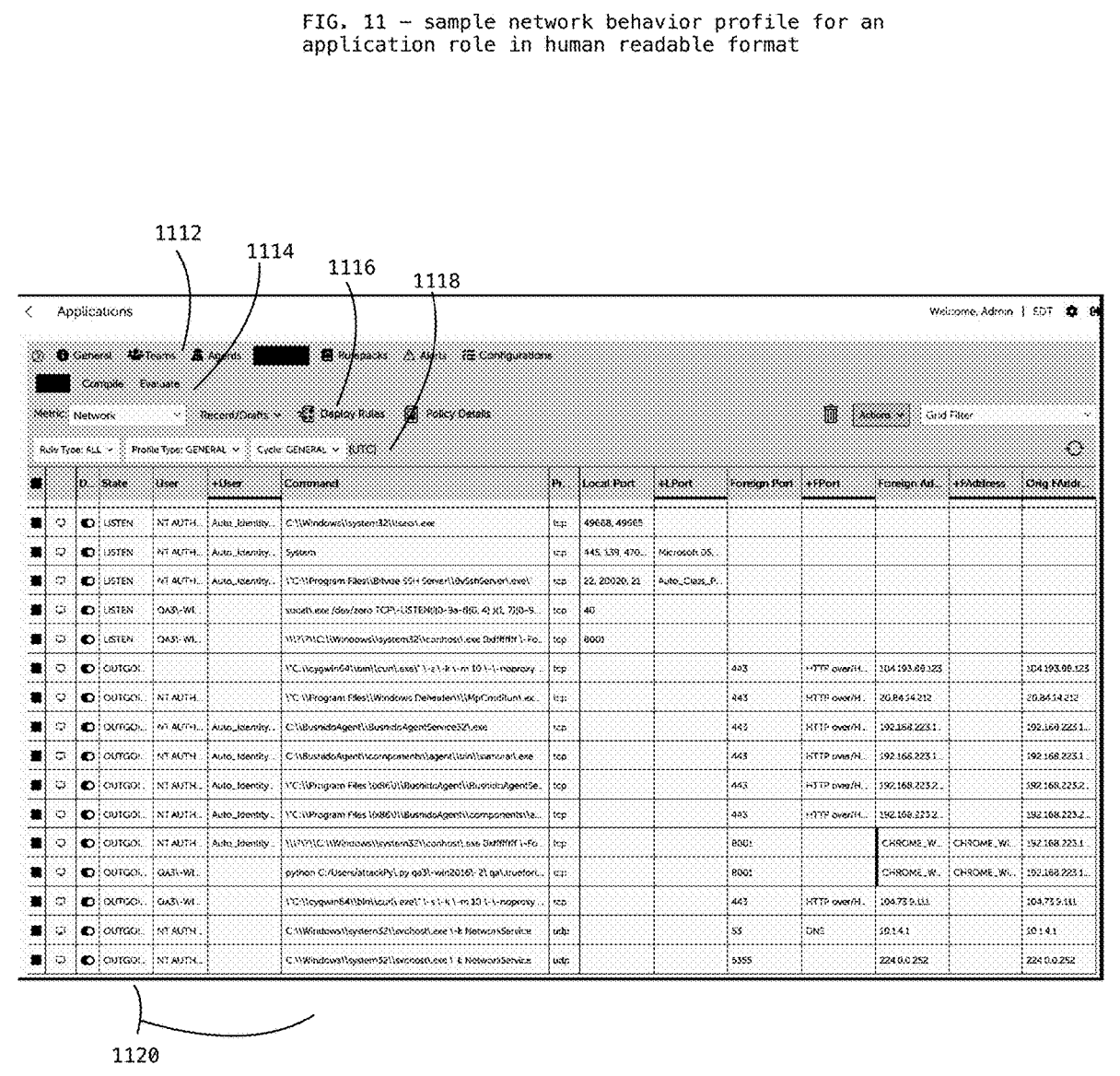

FIG. 11 depicts a schematic diagram and depicts an illustration of a GUI screen of an application profile definition and shows a sample network behavior profile for an application role in a human readable format. FIG. 11 shows top menu 1112 with pulldowns for general admin, team selection, agent selection, rulepacks selection, alerts selection, and configurations selection. Next level menu 1114 shows actionable menu with compile selection and evaluate selection menus. Next horizontal menu 1116 illustrates the metric source selection, recent/drafts, deploy rules, and policy details selection menus. Next horizontal menu 1116 also illustrates a trash option, an actions option, and a grid/view pulldown. The bottom menu 1118 shows pulldown selections for rule type, profile type, cycle status. Presentation columns 1120 illustrates the report showing the state, user, command, protocol, local port, foreign port, +Fport, foreign address, +Faddress, and originating Faddress columns.

Figure 12:
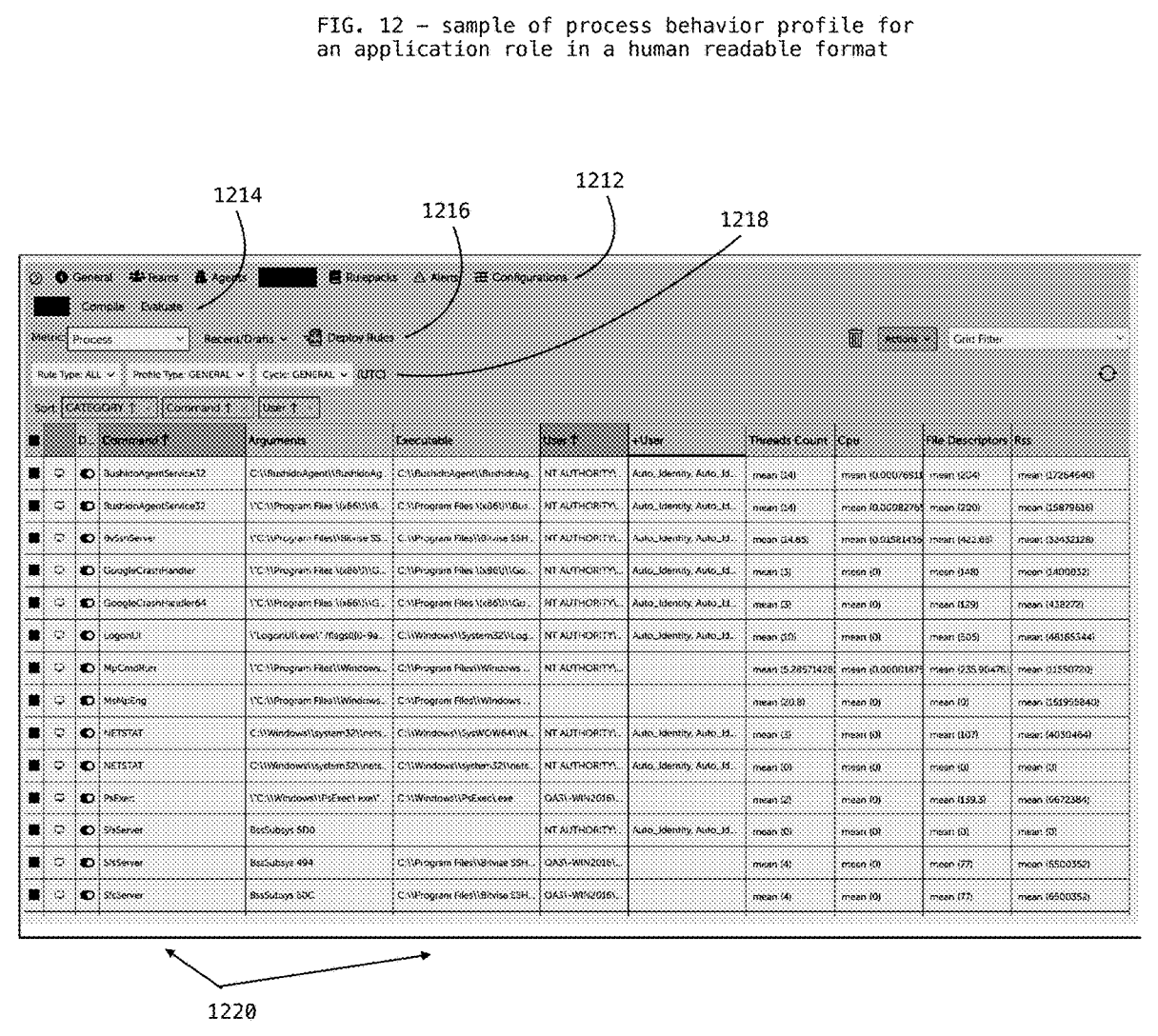

FIG. 12 depicts a schematic diagram and depicts an illustration of a GUI screen of an application profile definition and shows a sample of process behavior profile for an application role in a human readable format. FIG. 12 shows top menu 1212 with pulldowns for general admin, team selection, agent selection, rulepacks selection, alerts selection, and configurations selection. Next level menu 1214 shows actionable menu with compile selection and evaluate selection menus. Next horizontal menu 1216 illustrates the metric source selection, recent/drafts, deploy rules, and policy details selection menus. Next horizontal menu 1216 also illustrates a trash option, an actions option, and a grid/view pulldown. The bottom menu 1218 shows pulldown selections for rule type, profile type, cycle status. Presentation columns 1220 illustrates the sort Category report showing the command, arguments, executable, user, +user, threads count, CPU, file descriptors, and Rss columns.

FIG. 13 depicts a schematic diagram and depicts application-profile anomaly detection using using the anomaly detection engine 1318. The engine 1318 requires four components for this process: an Application-Role definition with assigned workloads module 1320-1322; an Application-Role profile module 1322; a module for Metrics published into the message bus 1330; and a Rulepacks module 1324. As the metrics 1330 are consumed by the anomaly detection engine 1318, they are mapped to the corresponding application-role. Rulepacks 1324 assigned to that application-role 1322 enable the engine 1318 to selectively choose which feature of the application-role profile to match with the consumed metrics. Any metric attributes that do not match the selected profile feature are considered anomalies. Alerts 1326 are generated as a result of these anomalies.

FIG. 14 depicts a schematic diagram and depicts application-role profile customization by supplementing or replacing the application-role profile with data from a new time range 1412, merging anomaly alerts into the application-role profile 1414, and manually editing application-profile rules 1416. Here, the system also allows customization of the learned application-role profile. Supplementing or replacing the application-role profile with a data from new time range. This process enables end-users to augment or replace the existing profile with metrics from a new time range. It is typically used when certain valid application-role behavior was not captured during the learning process and the end-user needs to incorporate the behavior from the new time range. In cases where the application-role profile is completely incorrect, it can be replaced entirely with the new data.

Another customization includes merging anomaly alerts into the application-role profile.

Anomaly alerts are generated when consumed metrics do not match the application-role profile, indicating abnormal behavior. These alerts can be used as feedback to enhance the existing application-profile with new behavior. After this process, the profile will include the behavior that triggered the alert.

Another customization includes manual editing of application-profile rules by users. Since the application-role profile is expressed in a human-readable format, end-users have the ability to directly edit it. Users can suspend or exclude certain features of the profile or add new features to it.

FIG. 15 is a flowchart and depicts one preferred non-limiting embodiment of a security process, according to the present invention. FIG. 15 shows step 1512 providing security platform in operative communication with one or more client computer networks. Step 1514 describes learning an application role profile by using native agent plugins to collect real-time time series application behavior workload telemetry (metrics) through a message bus to a central collector that consumes the telemetry metrics and persists them into a scalable data store, the metrics including network traffic, process, user activity, file integrity, installed software, network interface cars, system information, CPU/memory resource utilization, and file system. Step 1516 describes optionally obtaining metrics from public cloud providers, third-party agents, and NDR (Network Detection and Response) solutions, establishing a mapping between source metrics and equivalent metrics in the platform by assigning and transforming each attribute of the source metric to match the attributes of the native agent's metrics, wherein the mapping is carried out by a translator, each metric source having its own translator, wherein each translator is configured to acquire and identify metrics from their respective sources and map them to the system's equivalents, then once the metrics are translated into the native schema, they are published to the message bus, and the same process as the native agent's metrics is followed. Step 1518 describes after assigning workloads to the application-role construct and persisting historical metrics, initiating the Application-Role behavior learning process by providing the learning engine with the following learning engine data: Application, Role, start and end time, and the metric type for profiling. Step 1520 describes using the learning engine data, the learning engine performs the following steps: Iterating through all the workloads belonging to the specified Application-Role; Reading the persisted metrics data associated with the workloads within the specified time range; Tokenizing the attributes within the metrics data and identifying the pivot point for aggregation; Aggregating the metrics into time buckets; Identifying the attribute type within the metrics and applying a summarization method; Optionally, if applicable, match raw metric attribute values with stored classifiers for abstraction. Step 1522 describes presenting the resulting profiling in a human-readable format, providing format customization to end-users; and storing the results in the database as the profile for this Application-Role. And Step 1524 describes detecting anomalies using the anomaly detection engine using the defined application-role, acquired metrics, and application-role profile, the anomaly detection engine requires four components for this process: Application-Role definition with assigned workloads; Application-Role profile; Metrics published into the message bus; and Rulepacks; wherein as the metrics are consumed by the anomaly detection engine, they are mapped to the corresponding application-role, wherein the Rulepacks assigned to that application-role enable the engine to selectively choose which feature of the application-role profile to match with the consumed metrics, wherein any metric attributes that do not match the selected profile feature are considered anomalies, and wherein Alerts are generated as a result of these anomalies.

FIG. 16 is a schematic and depicts one preferred non-limiting embodiment of a security platform or security system, according to the present invention. FIG. 16 describes system component 1612 an Anomaly Detection Engine (ADE) configured to assign workloads to an application-role construct and to persist historical metrics in a scalable data store by learning an application role profile using native agent plugins to collect real-time time series application behavior workload telemetry (native agent metrics) through a message bus to a central collector that consumes the native agent metrics and persists them into a scalable data store, the native agent metric attributes including network traffic, process, user activity, file integrity, installed software, network interface cars, system information, CPU/memory resource utilization, and file system. FIG. 16 describes system component 1614, the Anomaly Detection Engine (ADE) configured to optionally obtain additional metrics from sources selected from public cloud providers, third-party agents, and NDR (Network Detection and Response) solutions, and the ADE configured to establish a mapping between native agent metric attributes and additional metric attributes by assigning and transforming each attribute of the additional metric to match the attributes of the native agent's metric attributes, wherein the mapping is carried out by a translator, each additional metric source having its own translator, wherein each translator is configured to acquire and identify additional metric attributes from their respective sources and map them to the equivalent native agent metric attributes, then once the additional metrics are translated into the native schema, the additional metrics are published to the message bus, and the same process as the native agent's metrics is performed. FIG. 16 describes system component 1616 a Learning Engine configured to initiate the Application-Role behavior learning process by providing the Learning Engine with the following learning engine data: Application, Role, start and end time, and the metric type for profiling, the Learning Engine also configured to use the learning engine data to perform the following steps: Iterating through all the workloads belonging to the specified Application-Role; Reading the persisted metrics data associated with the workloads within the specified time range; Tokenizing the attributes within the metrics data and identifying the pivot point for aggregation; Aggregating the metrics into time buckets; Identifying the attribute type within the metrics and applying a summarization method; Optionally, if applicable, match raw metric attribute values with stored classifiers for abstraction. FIG. 16 describes system component 1618 wherein the ADE configured to present resulting profiling in a human-readable format, provide format customization to end-users, and store results in the scalable data store as an Application-Role profile. And FIG. 16 describes system component 1620 wherein the ADE configured to detect anomalies using the defined application-role, acquired metrics, and application-role profile, the ADE configured to require four components for detecting anomalies: an Application-Role definition with assigned workloads Module; an Application-Role profile Module; a Metrics published into the message bus Module; and a Rulepacks Module; wherein as the metrics are consumed by the anomaly detection engine, they are mapped to the corresponding application-role, wherein the Rulepacks assigned to that application-role enable the engine to selectively choose which feature of the application-role profile to match with the consumed metrics, wherein any metric attributes that do not match the selected profile feature are considered anomalies, and wherein Alerts are generated as a result of these anomalies.

Figure 17:
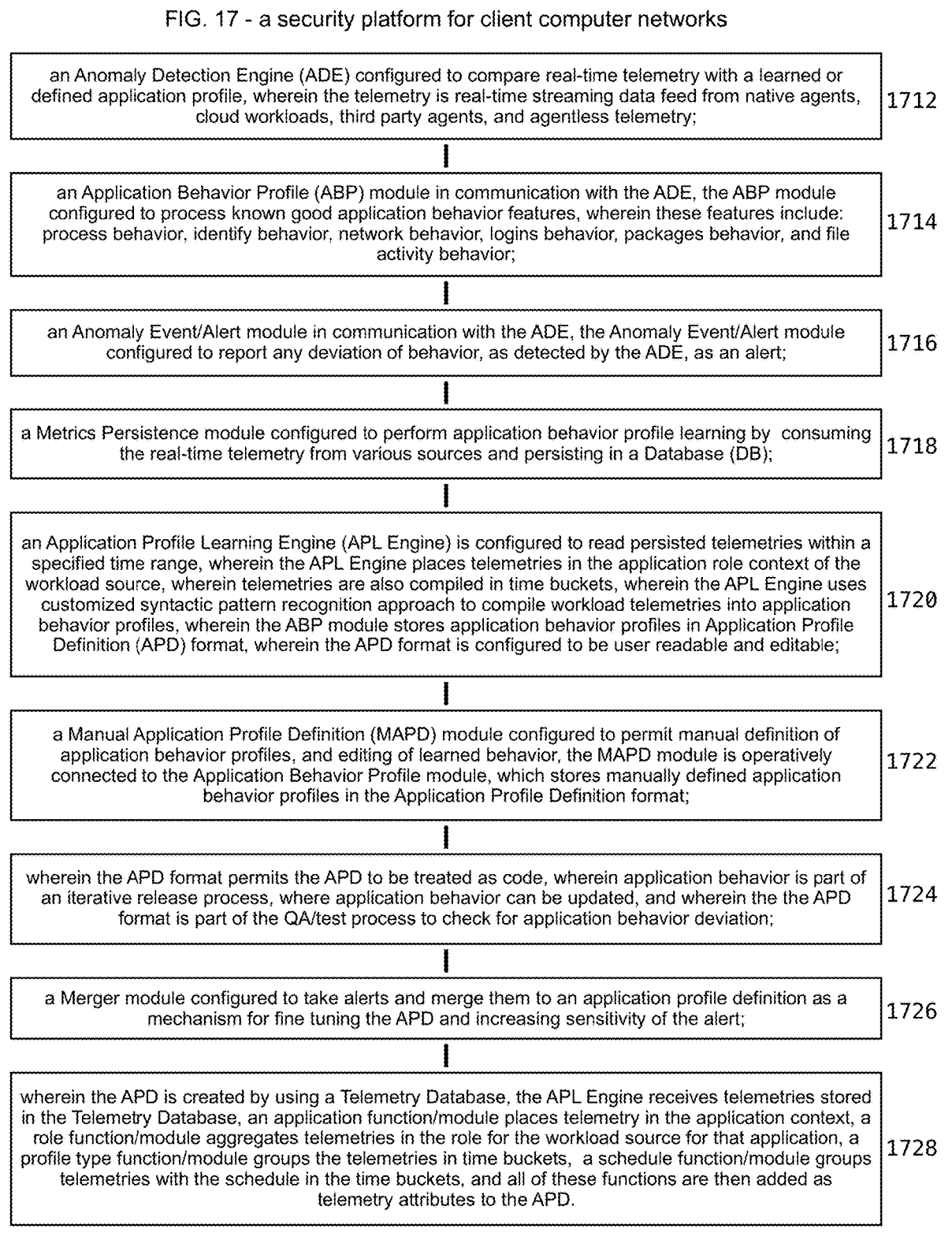

FIG. 17 is a schematic and depicts another preferred non-limiting embodiment of a security platform or security system, according to the present invention. FIG. 17 describes system component 1712 an Anomaly Detection Engine (ADE) configured to compare real-time telemetry with a learned or defined application profile, wherein the telemetry is real-time streaming data feed from native agents, cloud workloads, third party agents, and agentless telemetry. FIG. 17 describes system component 1714 an Application Behavior Profile (ABP) module in communication with the ADE, the ABP module configured to process known good application behavior features, wherein these features include: process behavior, identify behavior, network behavior, logins behavior, packages behavior, and file activity behavior. FIG. 17 describes system component 1716 an Anomaly Event/Alert module in communication with the ADE, the Anomaly Event/Alert module configured to report any deviation of behavior, as detected by the ADE, as an alert. FIG. 17 describes system component 1718 a Metrics Persistence module configured to perform application behavior profile learning by consuming the real-time telemetry from various sources and persisting in a Database (DB). FIG. 17 describes system component 1720 an Application Profile Learning Engine (APL Engine) is configured to read persisted telemetries within a specified time range, wherein the APL Engine places telemetries in the application role context of the workload source, wherein telemetries are also compiled in time buckets, wherein the APL Engine uses customized syntactic pattern recognition approach to compile workload telemetries into application behavior profiles, wherein the ABP module stores application behavior profiles in Application Profile Definition (APD) format, wherein the APD format is configured to be user readable and editable. FIG. 17 describes system component 1722 a Manual Application Profile Definition (MAPD) module configured to permit manual definition of application behavior profiles, and editing of learned behavior, the MAPD module is operatively connected to the Application Behavior Profile module, which stores manually defined application behavior profiles in the Application Profile Definition format. FIG. 17 describes system component 1724 wherein the APD format permits the APD to be treated as code, wherein application behavior is part of an iterative release process, where application behavior can be updated, and wherein the the APD format is part of the QA/test process to check for application behavior deviation. FIG. 17 describes system component 1726 a Merger module configured to take alerts and merge them to an application profile definition as a mechanism for fine tuning the APD and increasing sensitivity of the alert. And FIG. 17 describes system component 1728 wherein the APD is created by using a Telemetry Database, the APL Engine receives telemetries stored in the Telemetry Database, an application function/module places telemetry in the application context, a role function/module aggregates telemetries in the role for the workload source for that application, a profile type function/module groups the telemetries in time buckets, a schedule function/module groups telemetries with the schedule in the time buckets, and all of these functions are then added as telemetry attributes to the APD.

FIG. 18 is a schematic and depicts another preferred non-limiting embodiment of a security process, according to the present invention. FIG. 18 describes process Step 1812 providing security platform in operative communication with one or more client computer networks; process Step 1814 comparing telemetry from real-time streaming data feed from native agents, cloud workloads, third party, and agentless, with a learned or defined application profile in an Anomaly Detection Engine; process Step 1816 processing known good application behavior features in an Application Behavior Profile module in operative communication with the Anomaly Detection Engine, the features include: process behavior, identify behavior, network behavior, logins behavior, packages behavior, and file activity behavior; process Step 1818 reporting any deviation of behavior, as detected by the Anomaly Detection Engine, as an alert, using an Anomaly Event/Alert module in operative communication with the Anomaly Detection Engine. FIG. 18 also describes process Step 1820 performing application behavior profile learning in a Metrics Persistence module by consuming the real-time telemetry from various sources and persisting in a Database (DB); process Step 1822 in an Application Profile Learning Engine (module), reading persisted telemetries within a specified time range, placing telemetries in the application role context of workload source, compiling telemetries in time buckets, using a customized syntactic pattern recognition approach to compile workload telemetries into application behavior profiles, storing application behavior profiles in an Application Profile Definition (APD) format, the APD format configured to be user readable and editable; process Step 1824 permitting manual definition of application behavior profiles and editing learned behavior in Manual Application Profile Definition (MAPD) module, the MAPD module connected to the Application Behavior Profile module, which stores manually defined application behavior profiles in APD format; process Step 1826 configuring the Application Profile Definition (APD) format to be treated as code, wherein application behavior is part of an iterative release process, where application behavior is updated, and wherein the the APD format is part of the QA/test process to check for application behavior deviation; process Step 1828 taking alerts and merging them to an application profile definition in a Merger module as a mechanism for fine tuning the APD and increasing sensitivity of the alert; And process Step 1830 wherein creating the APD uses a Telemetry Database for storing the telemetries, receiving telemetries stored in the Telemetry Database uses the APD Learning Engine, placing telemetry in application context uses an application function/module, aggregating telemetries in the role for workload source for that application uses a role function/module, grouping telemetries in time buckets uses a profile type function/module, grouping telemetries with the schedule in time buckets uses a schedule function/module, and adding these functions as telemetry attributes to the APD.

FIG. 19 is a schematic and depicts a preferred non-limiting embodiment of application-role profile customization steps for a security process, according to the present invention. FIG. 19 describes process Step 1912 (#1) Supplementing or replacing the application-role profile with a data from new time range. This process enables end-users to augment or replace the existing profile with metrics from a new time range. It is typically used when certain valid application-role behavior was not captured during the learning process and the end-user needs to incorporate the behavior from the new time range. In cases where the application-role profile is completely incorrect, it can be replaced entirely with the new data. FIG. 19 describes process Step 1914 (#2) as, alone or in combination, optionally, Merging anomaly alerts into the application-role profile. Anomaly alerts are generated when consumed metrics do not match the application-role profile, indicating abnormal behavior. These alerts can be used as feedback to enhance the existing application-profile with new behavior. After this process, the profile will include the behavior that triggered the alert. FIG. 19 describes process Step 1916 (#3) as, alone or in combination, optionally, Manual editing of application-profile rules by users. Since the application-role profile is expressed in a human-readable format, end-users have the ability to directly edit it. Users can suspend or exclude certain features of the profile or add new features to it.

The terminology used herein is for the purpose of describing particular embodiments only and is not intended to limit the full scope of the claims. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

As used herein, the singular forms "a", "an" and "the" are intended to include the plural forms as well, unless the context clearly indicates otherwise. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," etc.). Similarly, the terms "comprises" and/or "comprising," when used in this specification, specify the presence of stated features, integers (or fractions thereof), steps, operations, elements, and/or components, but do not preclude the presence or addition of one or more other features, integers (or fractions thereof), steps, operations, elements, components, and/or groups thereof.

As used in this document, the term "comprising" means "including, but not limited to."

As used herein the term "and/or" includes any and all combinations of one or more of the associated listed items. It should be understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All ranges disclosed herein also encompass any and all possible subranges and combinations of subranges thereof unless expressly stated otherwise. Any listed range should be recognized as sufficiently describing and enabling the same range being broken down into at least equal subparts unless expressly stated otherwise. As will be understood by one skilled in the art, a range includes each individual member.

Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Rather, these embodiments are provided so that this disclosure will be thorough and complete, and will fully convey the scope of the inventive concepts to those skilled in the art. Like numbers refer to like elements throughout.

Any of the systems and methods disclosed herein may include a network connecting a computing device configured with a security agent to a security cloud server that provides configuration, analysis, and correcting to the computing device through the security agent. A computing device may include components such as processors, network interfaces, memory, an operating system, processes, and log files.

Any of the systems and methods disclosed herein may include wherein devices of the security cloud server also include processors, network interfaces, memory, a communications module, an analysis module, a configuration module, a corrective module to halt or deceive malware executing on the computing device, an alert module to notify other computing devices or users of the malware detected on the computing device, and an administrative user interface (UI) to enable an administrator associated with the security cloud server to view notifications of observed events and make decisions regarding appropriate responses to those events.

Any of the systems and methods disclosed herein may include wherein the cloud security server is a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices including distributed nodes and virtual machines.

Any of the systems or methods disclosed herein may include a machine in the example form of computer system, within which a set of instructions for causing the machine to perform any one or more of the methodologies, processes or functions discussed herein may be executed. In some examples, the machine is a mobile device in communication with a server, a desktop computer in communication with a cloud server, a device or devices in a peer-to-peer network, an IoT device, a device with cloud-based hosted applications, or a virtual device. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein.

Example computer system may include processor, memory, data storage and communication interface, which may communicate with each other via data and control bus. In some examples, computer system also includes display and/or user interface.

Processor may include, without being limited to, a microprocessor, a central processing unit, an application specific integrated circuit (ASIC), a field programmable gate array (FPGA), a digital signal processor (DSP) and/or a network processor. Any of the systems and methods disclosed herein may include a processor(s) including a central processing unit (CPU) or a graphic processing unit (GPU). Processor may be configured to execute processing logic for performing the operations described herein. In general, processor may include any suitable special-purpose processing device specially programmed with processing logic to perform the operations described herein.

Memory may include, for example, without being limited to, at least one of a read-only memory (ROM), a random access memory (RAM), a flash memory, a dynamic RAM (DRAM) and a static RAM (SRAM), storing computer-readable instructions executable by processing device. In general, memory may include any suitable non-transitory computer readable storage medium storing computer-readable instructions executable by processing device for performing the operations described herein. In some examples, computer system may include two or more memory devices (e.g., dynamic memory and static memory).

Computer system may include communication interface device, for direct communication with other computers (including wired and/or wireless communication), and/or for communication with network. In some examples, computer system may include display device (e.g., a liquid crystal display (LCD), a touch sensitive display, etc.). In some examples, computer system may include user interface (e.g., touchscreen, keyboard, an alphanumeric input device, a cursor control device, etc.).

In some examples, computer system may include data storage device storing instructions (e.g., software) for performing any one or more of the functions described herein. Data storage device may include any suitable non-transitory computer-readable storage medium, including, without being limited to, solid-state memories, optical media and magnetic media.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, Software applications or code) include machine instructions for a programmable processor, and may be implemented in a high-level procedural and/or object-oriented programming language, and/or in assembly/machine language.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. To provide for interaction with a user, the systems and techniques described here may be implemented on a computer having a display device for displaying information to the user and a U.I. touchscreen, stylus pencil, voice command, keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or frontend components.

Any of the systems and methods disclosed herein may include a network, such as wired networks, wireless networks, and combinations of wired and wireless networks. Further, the network may include any one or combination of multiple different types of public or private networks (e.g., cable networks, the Internet, wireless networks, etc.). The components of the system may be interconnected by any form or medium of digital data communication (e.g., a communication network). Examples of communication networks include a local area network ("LAN"), a wide area network ("WAN"), and the Internet. The computing system may include clients and servers. A client and server are generally remote from each other and typically interact through a communication network. The relationship of client and server arises by virtue of computer programs running on the respective computers and having a client-server relationship to each other. A number of embodiments have been described. Nevertheless, it will be understood that various modifications may be made without departing from the spirit and scope of the invention.

Many modifications and variations can be made without departing from its spirit and scope, as will be apparent to those skilled in the art. Functionally equivalent methods and systems within the scope of the disclosure, in addition to those enumerated herein, will be apparent to those skilled in the art from the foregoing descriptions. Such modifications, variations, and Equivalents are intended to fall within the scope of the appended claims. The present disclosure is to be limited only by the terms of the appended claims, along with the full scope of equivalents to which such claims are entitled. It is to be understood that this disclosure is not limited to particular methods and systems, which can, of course, vary. It is also to be understood that the terminology used herein is for the purpose of describing particular embodiments only, and is not intended to be limiting.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Where schematics and/or embodiments described above indicate certain components arranged in certain orientations or positions, the arrangement of components may be modified. While the embodiments have been particularly shown and described, it will be understood that various changes in form and details may be made. Any portion of the apparatus and/or methods described herein may be combined in any combination, except mutually exclusive combinations.

The embodiments described herein can include various combinations and/or sub-combinations of the functions, components, and/or features of the different embodiments described. Various of the above-disclosed and other features and functions, or alternatives thereof, may be combined into many other different systems or applications.

Various presently unforeseen or unanticipated alternatives, modifications, variations, or improvements therein may be subsequently made by those skilled in the art, each of which is also intended to be encompassed by the disclosed embodiments.

The invention claimed is:

1. A security process having programming instructions executable on a processor configured to effect, by a security platform in operative communication with one or more client computer networks, the method comprises the steps, learning an application role profile by using native agent plugins to collect real-time time series application behavior workload telemetry (metrics) through a message bus to a central collector that consumes the telemetry metrics and persists them into a scalable data store, the metrics including network traffic, process, user activity, file integrity, installed software, network interface cars, system information, CPU/memory resource utilization, and file system;

obtaining metrics from public cloud providers, third-party agents, and network detection and response (NDR) solutions, establishing a mapping between source metrics and equivalent metrics in the platform by assigning and transforming each attribute of the source metric to match the attributes of the native agent's metrics, wherein the mapping is carried out by a translator, each metric source having its own translator, wherein each translator is configured to acquire and identify metrics from their respective sources and map them to the system's equivalents, then once the metrics are translated into a native schema, they are published to a message bus, and the same process as the native agent's metrics is followed;

after assigning workloads to the application-role construct and persisting historical metrics, initiating the application-role behavior learning process by providing a learning engine with the following learning engine data: application, role, start and end time, and a metric type for profiling;

using the learning engine data, the learning engine performing the following steps: iterating through all workloads belonging to a specified application-role; reading the persisted metrics data associated with the workloads within a specified time range; tokenizing attributes within the persisted metrics data and identifying a pivot point for aggregation; aggregating the persisted metrics data into time buckets; identifying an attribute type within the persisted metrics data and applying a summarization method; and matching raw persisted metric data attribute values with stored classifiers for abstraction to generate a profiling;

presenting the profiling in a human-readable format, providing format customization to end-users, and storing the profiling in a database as a profile for the specified application-role;

detecting anomalies using the anomaly detection engine using the defined application-role, acquired metrics, and application-role profile, the anomaly detection engine requires four components for this process: application-role definition with assigned workloads; application-role profile; metrics published into the message bus; and rulepacks;

wherein as the metrics are consumed by the anomaly detection engine, they are mapped to the corresponding application-role, wherein the rulepacks assigned to that application-role enable the engine to selectively choose which feature of the application-role profile to match with the consumed metrics, wherein any metric attributes that do not match the selected profile feature are considered anomalies, and wherein alerts are generated as a result of these anomalies.

2. A method for a security platform having programming instructions executable on a processor configured to effect, by the security platform in operative communication with one or more client computer networks, the method comprises the steps, comparing real-time telemetry of application behavior with a learned or defined application profile definition (APD) in an anomaly detection engine (module), wherein the telemetry is real-time streaming data feed from native agents, cloud workloads, third party agents, and agentless telemetry;

processing known good application behavior features in an application behavior profile module in operative communication with the anomaly detection engine, wherein the good application behavior features include:

process behavior, identify behavior, network behavior, logins behavior, packages behavior, and file activity behavior;

reporting a deviation of the good application behavior features, as detected by the anomaly detection engine, as an alert, using an anomaly event/alert module in operative communication with the anomaly detection engine;

performing application behavior profile learning in a metrics persistence module by consuming the real-time telemetry from various sources and persisting the real-time telemetries in a database;

in an application profile learning engine (module), reading the persisted real-time telemetries within a specified time range, placing the persisted real-time telemetries in an application role context of a workload source, compiling the persisted real-time telemetries in time buckets, using a customized syntactic pattern recognition approach on the compiled persisted real-time telemetries to compile workload telemetries into an application behavior profile, storing the application behavior profile in an application profile definition (APD) format, wherein the APD format is configured to be user readable and editable;

permitting manual definition of an application behavior profile and editing of learned behavior in a manual application profile definition (MAPD) module, the MAPD module is operatively connected to the application behavior profile module, which stores the manually defined application behavior profile in the APD format;

wherein the APD format permits the application profile definition to be treated as code, wherein creating the application profile definition from application behavior is part of an iterative release process, where application behavior can be updated from the application profile definition, and wherein the APD format is part of an QA/test process to check for the deviation from good application behavior features;

taking the alert and merging the alert into the application profile definition in a merger module as a mechanism for fine tuning the application profile definition and increasing sensitivity of the alert;

wherein creating the application profile definition uses a telemetry database used for storing the telemetries, wherein receiving telemetries stored in the telemetry database uses the APD learning engine, wherein placing the telemetry in the application role context uses an application function/module, wherein aggregating the telemetries in the application role context for the workload source for that application uses a role function/module, wherein grouping the telemetries in time buckets uses a profile type function/module, wherein grouping the telemetries with a schedule in time buckets uses a schedule function/module, and adding these functions as telemetry attributes to the application profile definition.

* * * * *